United States Patent
Hayashi et al.

(10) Patent No.: US 8,722,786 B2
(45) Date of Patent: May 13, 2014

(54) PAINT COMPOSITION FOR HEAT RELEASING PRODUCTS

(75) Inventors: Kotaro Hayashi, Ibi-gun (JP); Takumi Domae, Ibi-gun (JP); Kenzo Saiki, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 76 days.

(21) Appl. No.: 13/420,651

(22) Filed: Mar. 15, 2012

(65) Prior Publication Data

US 2012/0234684 A1   Sep. 20, 2012

(30) Foreign Application Priority Data

Mar. 16, 2011   (JP) ................................. 2011-057964

(51) Int. Cl.
   *C09D 5/44*   (2006.01)
(52) U.S. Cl.
   USPC ........................................................ 524/494
(58) Field of Classification Search
   USPC ........................................................ 524/949
   IPC ......... C09D 5/448,5/4484; C23C 24/085; F01N 13/14
   See application file for complete search history.

(56) References Cited

U.S. PATENT DOCUMENTS 5,603,818 A * 2/1997 Brent et al. .................. 204/488

FOREIGN PATENT DOCUMENTS

| EP | 2210919 | 7/2010 |
|---|---|---|
| EP | 2210920 | 7/2010 |
| JP | 56-005867 | * 1/1981 |
| JP | 2009-133213 | 6/2009 |
| JP | 2009-133214 | 6/2009 |

OTHER PUBLICATIONS

Database WPI Week 198815 Thomson Scientific, London, GB; AN 1988-102617 XP002675959.
Database WPI Week 200313 Thomson Scientific, London, GB; AN 2003-132503 XP002675960.

* cited by examiner

*Primary Examiner* — Kishor Mayekar
(74) *Attorney, Agent, or Firm* — Ditthavong Mori & Steiner, P.C.

(57) ABSTRACT

A paint composition for heat releasing products includes inorganic glass particles and an organic binder. The organic binder includes an electrocoating resin. The paint composition is to be applied to a base material made of a metal. The electrocoating resin preferably has a weight ratio of from about 1.0 to about 3.5 based on a weight of the inorganic glass particles. The paint composition preferably further includes inorganic particles.

16 Claims, 5 Drawing Sheets

PAINT COMPOSITION FOR HEAT RELEASING PRODUCTS

CROSS-REFERENCE TO RELATED APPLICATIONS

The present application claims priority under 35 U.S.C. §119 to Japanese Application 2011-057964, filed on Mar. 16, 2011, the contents of which are incorporated herein by reference in their entirety.

BACKGROUND OF THE INVENTION

1. Field of the Invention

The present invention relates to a paint composition for heat releasing products.

2. Discussion of the Background

In order to treat injurious substances such as injurious gases contained in exhaust gas discharged from an engine, a catalyst converter is installed in an exhaust gas passage in an exhaust pipe.

In order to improve purifying efficiency for injurious substances by such a catalyst converter, it is necessary to maintain the temperature of exhaust gas and the temperature of the exhaust pipe and the like through which the exhaust gas is allowed to flow, at temperatures suitable for activating the catalyst (hereinafter, referred to also as catalyst activating temperatures).

However, during high-speed driving of the engine, the exhaust gas temporarily has such a high temperature as to exceed 1000° C. Therefore, the temperature of the exhaust gas sometimes becomes higher than the upper limit of the catalyst activating temperature range. As a result, problems are raised in that it becomes difficult to efficiently purify exhaust gas and in that the catalyst deteriorates.

For this reason, an exhaust pipe to be connected to an automobile engine needs to be capable of externally radiating heat of the exhaust gas that flows through the exhaust pipe, during high-speed driving of the automobile engine.

JP-A 2009-133213 and JP-A 2009-133214 have disclosed an exhaust pipe having a structure in which a layer composed of a crystalline inorganic material and an amorphous inorganic material is formed on a surface of a cylindrical base material made of a metal.

Specifically, JP-A2009-133213 has disclosed an exhaust pipe having an excellent heat releasing characteristic in which the layer composed of a crystalline inorganic material and an amorphous inorganic material has an infrared-ray emissivity higher than the infrared-ray emissivity of the base material.

JP-A 2009-133214 has disclosed an exhaust pipe having an excellent heat releasing characteristic in which the amorphous inorganic material located on the outer circumferential side from the crystalline inorganic material has an average thickness of 20 μm or less.

The contents of JP-A 2009-133213 and JP-A 2009-133214 are incorporated herein by reference in their entirety.

SUMMARY OF THE INVENTION

According to one aspect of the present invention, a paint composition for heat releasing products includes inorganic glass particles and an organic binder. The organic binder includes an electrocoating resin. The paint composition is to be applied to a base material made of a metal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
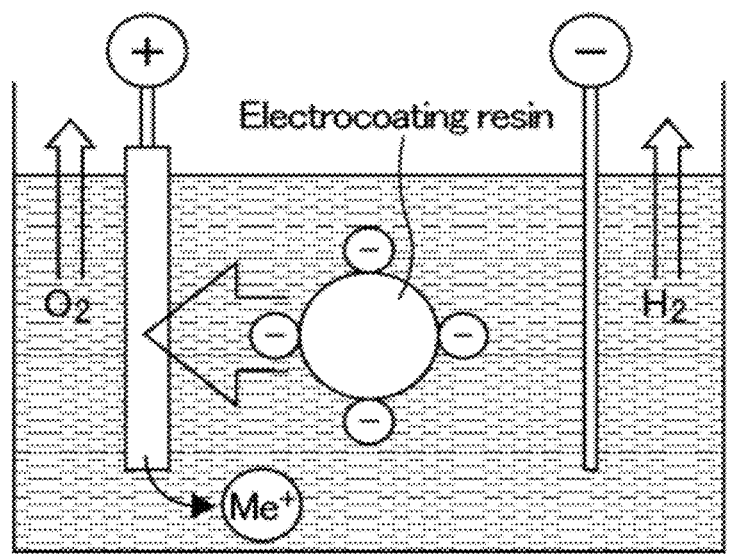
FIG. 1A is an explanatory drawing that schematically illustrates the process of anionic electrocoating.

The embodiments will now be described with reference to the accompanying drawings, wherein like reference numerals designate corresponding or identical elements throughout the various drawings.

In accordance with the inventions disclosed in JP-A 2009-133213 and JP-A 2009-133214, it has become possible to provide an exhaust pipe having an excellent heat releasing characteristic. However, there have been still strong demands for an exhaust pipe having a still better heat releasing characteristic.

Specifically, a paint composition for heat releasing products according to the present embodiment is intended to be applied to a base material made of a metal, and includes:

inorganic glass particles; and an organic binder.

The organic binder includes an electrocoating resin.

The paint composition for heat releasing products according to the present embodiment includes an organic binder and the organic binder includes an electrocoating resin. Namely, the paint composition for heat releasing products includes an electrocoating resin which allows the paint composition for heat releasing products to be used for electrocoating. The paint composition for heat releasing products can be applied to a base material made of a metal (metal base material) by electrocoating. A coating layer formed by applying the paint composition for heat releasing products tends to be converted into a surface coating layer having convex portions on the surface thereof by heating.

Figure 1B:
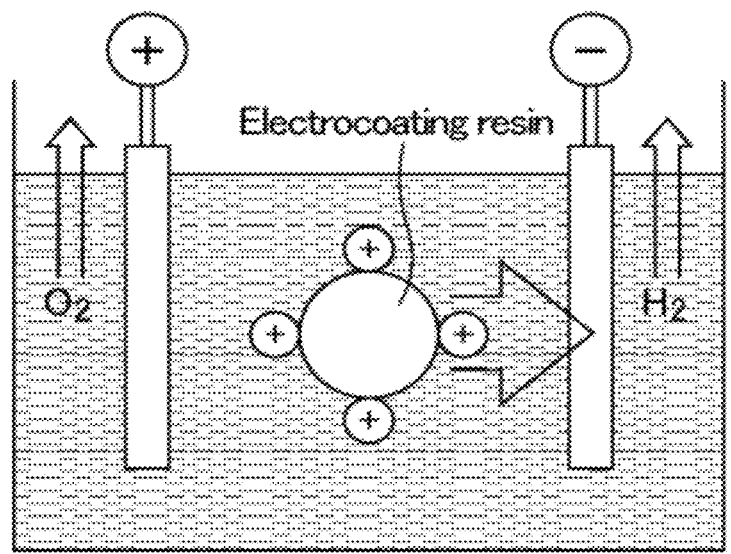
FIG. 1B is an explanatory drawing that schematically illustrates the process of cationic electrocoating.

Referring to FIGS. 1A and 1B as well as FIGS. 2A to 2E, a description will be given.

FIG. 1A is an explanatory drawing that schematically illustrates the process of anionic electrocoating.

FIG. 1B is an explanatory drawing that schematically illustrates the process of cationic electrocoating.

FIGS. 2A to 2E are explanatory drawings that schematically illustrate one example of the production of an exhaust pipe using the paint composition for heat releasing products according to one embodiment of the present invention.

As shown in FIGS. 1A and 1B, the electrocoating may be anionic electrocoating or cationic electrocoating.

Although an anionic electrocoating resin is used as the electrocoating resin in the example shown in FIGS. 2A to 2E, a cationic electrocoating resin may alternatively be used as the electrocoating resin. Additionally, the paint composition and the surface coating layer, although containing inorganic particles in this example, may not contain inorganic particles.

In the case of anionic electrocoating, an anionic electrocoating resin is used as the electrocoating resin.

The anionic electrocoating resin has a functional group (for example, carboxyl group) that reacts with a base to form a salt, and is negatively charged as a result of neutralization with a base (for example, organic amine) (see the following formula).

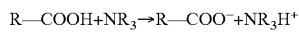

When a current is applied to a metal base material and an electrode plate disposed in an electrocoating vessel, the electrocoating resin negatively charged is attracted toward the anode (see FIG. 1A) so that inorganic glass particles and the like contained in the paint composition are carried onto the surface of the metal base material (object to be coated) together with the electrocoating resin. When the electrocoating resin is brought into contact with the surface of the metal base material, the following reactions (i) and (ii) proceed:

Consequently, since the electrocoating resin becomes insoluble, the inorganic glass particles and the like are deposited on the surface of the metal base material (anode).

In contrast, in the case of cationic electrocoating, a cationic electrocoating resin is used as the electrocoating resin.

Since the cationic electrocoating resin becomes positively charged, and therefore is attracted toward the cathode (see FIG. 1B), the inorganic glass particles and the like are deposited on the surface of the metal base material (cathode).

Figure 2A:
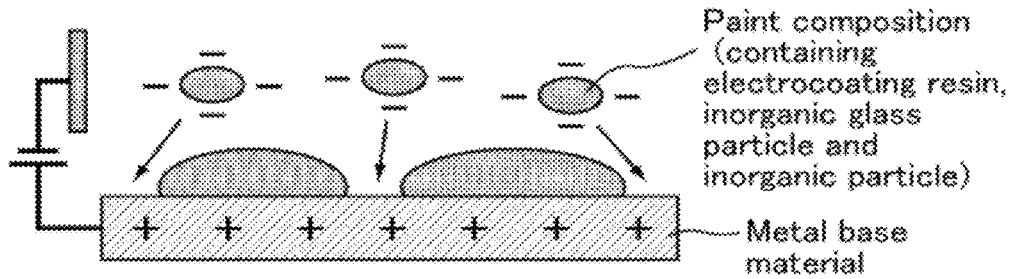
FIGS. 2A to 2E are explanatory drawings that schematically illustrate one example of the production of an exhaust pipe using the paint composition for heat releasing products of the embodiment of the present invention.
Figure 2B:
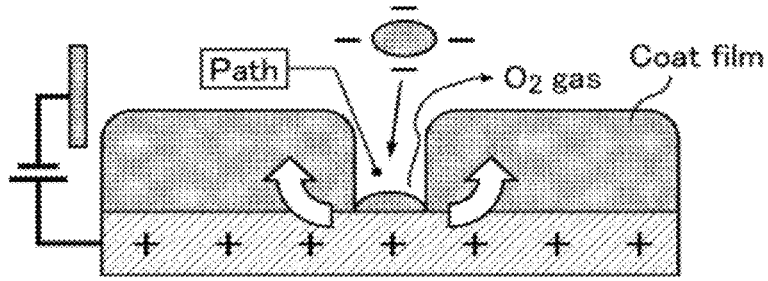
Figure 2C:
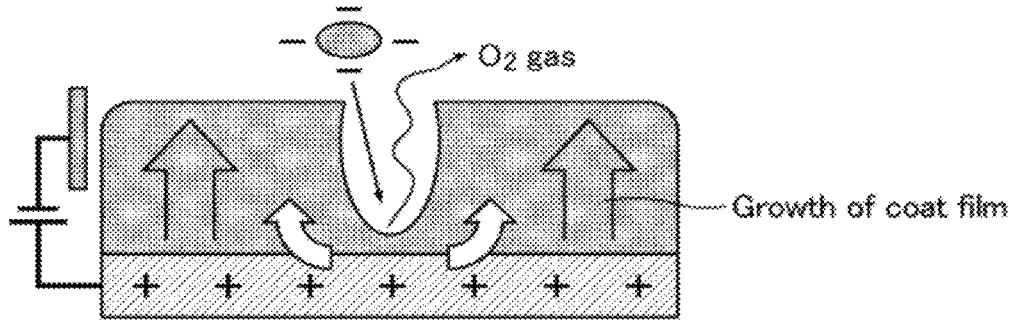
Figure 2D:
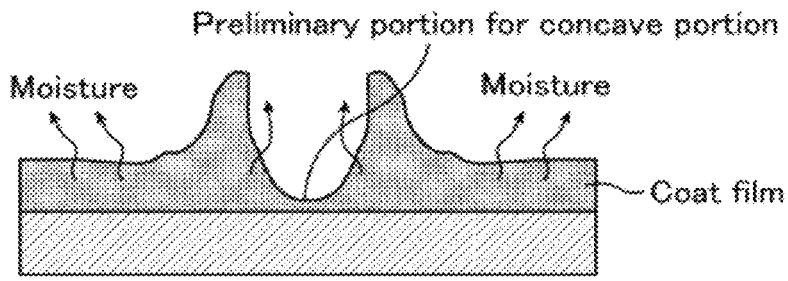
Figure 2E:
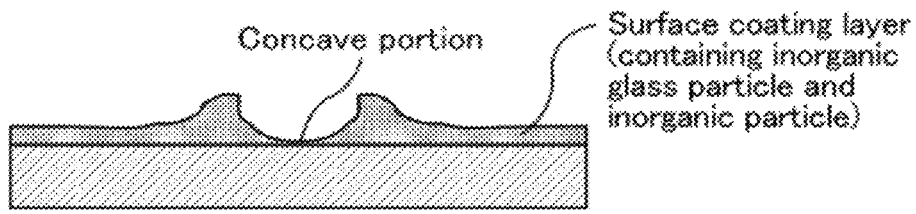

As described above, in the electrocoating, the electrocoating resin carries the inorganic glass particles and the like onto the surface of the metal base material (see FIG. 2A). Then, the electrocoating resin is brought into contact with the surface of the metal base material, and deposited on the surface of the metal base material (see FIGS. 2B and 2C). At this time, paths through which the soluble electrocoating resin is allowed to pass are formed in the coat film (see FIGS. 2B and 2C). As shown in the reaction formula (I), when the electrocoating resin is brought into contact with the surface of the metal base material, oxygen gas is generated. These paths are formed when the oxygen gas pushes a portion of the already formed coat film aside to proceed into the paint solution. In some cases, the electrocoating resin still remains inside the paths after the electrocoating. However, the remaining electrocoating resin washes off with water because it is not deposited on the surface of the metal base material and remains in a soluble state.

Thereafter, the electrocoating resin is burned out by heating the coat film so that the volume of the coat film is contracted. In this process, concave portions corresponding to the paths tend to be formed (see FIGS. 2D and 2E).

Since the heat releasing product produced by applying the paint composition for heat releasing products to the metal base material tends to have such concave portions on the surface of the surface coating layer, the heat releasing product tends to have a large surface area and a high apparent emissivity. Accordingly, the radiant heat transfer of the heat releasing product tends to be improved, which possibly leads to an excellent heat releasing characteristic of the heat releasing product. Thus, the paint composition for heat releasing products according to one embodiment of the present invention tends to provide a heat releasing product having an excellent heat releasing characteristic.

Moreover, due to the concave portions formed on the surface of the surface coating layer, the surface coating layer tends to be provided with many portions capable of serving as non-fixed ends for dispersing thermal stress. Furthermore, due to the concave portions formed on the surface of the surface coating layer, the surface coating layer is provided with portions having a thinner film thickness. Since the temperature difference in the thickness direction in each of these portions is small, thermal stress hardly occurs inside the surface coating layer. Therefore, the thermal stress due to thermal impact is likely to be alleviated, thereby possibly preventing the surface coating layer from coming off. Thus, the paint composition for heat releasing products according to the embodiment of the present invention tends to provide a heat releasing product having a surface layer with excellent heat impact resistance.

The term "surface coating layer" herein means a layer formed on the surface of a metal base material, which is obtained by subjecting a coat film to firing (to be described later). A layer formed on a metal base material is referred to as a "coat film" prior to the firing and is referred to as a "surface coating layer" after the firing. The term "heat releasing product" means a product provided with a metal base material and a surface coating layer.

The paint composition for heat releasing products according to another embodiment of the present invention preferably further includes inorganic particles.

Since the inorganic particles are a material having a high emissivity, infrared rays are released strongly when the paint composition is heated. This is indicated by Stefan-Boltzmann law represented by the following equation:

$$q = \epsilon \sigma (T_1^4 - T_2^4)$$

($\sigma$: Stefan-Boltzmann constant . . . $5.67 \times 10^{-8}$ [W/m$^2$·K$^4$], q: heat flux [W/m$^2$], $\epsilon$: emissivity, $T_1$: heating unit temperature [K], $T_2$: heat receiving unit temperature [K]).

Therefore, a heat releasing product obtained by applying the paint composition for heat releasing products which contains inorganic particles is provided with a surface coating layer having a high emissivity because the inorganic particles in the surface coating layer emit infrared rays. Thus, the heat releasing product tends to have an excellent heat releasing characteristic at high temperatures.

Moreover, the inorganic glass particles are softened during the firing so that its flowability tends to become low to suppress the flow of the coat film around the concave portions. Presumably, this facilitates the formation of concave portions on the surface of the surface coating layer.

Thus, the embodiment of the present invention tends to provide a heat releasing product which has a further improved heat releasing characteristic due to its high emissivity and concave portions on the surface.

The paint composition for heat releasing products according to still another embodiment of the present invention preferably contains inorganic glass particles and an organic binder, and the electrocoating resin has a weight ratio of about 1.0 to about 3.5 based on the weight of the inorganic glass particles.

The paint composition for heat releasing products according to still another embodiment of the present invention contains inorganic particles, inorganic glass particles and an organic binder, and the electrocoating resin preferably has a weight ratio of about 1.0 to about 3.5 based on the total weight of the inorganic particles and the inorganic glass particles.

When the amount of the electrocoating resin contained in the paint composition for heat releasing products is not so large, the volume ratios of the inorganic particles and inorganic glass particles are not so low. In this case, the inorganic particles and the inorganic glass particles are less likely to be separated from one another in the coat film. Thus, the inorganic particles and the inorganic glass particles tend to be combined with each other; therefore, even when the electrocoating resin is heated and burned out during degreasing of the electrocoating resin, the inorganic particles and the inorganic glass particles tend not to collapse and fall off.

The "degreasing" refers to a process for burning the electrocoating resin out by heating.

In addition, in the case where the amount of the electrocoating resin contained in the paint composition for heat releasing products is not so small, the densities of the inorganic particles and inorganic glass particles contained in the paint composition for heat releasing products are not too high. Therefore, the coat film deposited by the electrocoating is less likely to contain a large amount of solids (particles). Consequently, due to good flowability of the coat film during application of the electrocoating current, the path formation and coat film formation around the paths tend to successfully progress. As a result, desired concave portions also tend to be formed on the surface of the resulting heat releasing product. Moreover, when the amounts of the inorganic particles and inorganic glass particles contained in the paint composition for heat releasing products are not so large, the inorganic particles and the inorganic glass particles tend not to be precipitated, and the particle concentration in the paint solution tends not to change. Therefore, the coating conditions are less likely to change. Accordingly, this presumably enables to form a coat film in a stable manner. Moreover, it becomes easier to avoid the problem of sedimentation of the particles onto the bottom surface of the electrocoating vessel.

Regarding the paint compositions for heat releasing products according to the embodiments of the present invention, since the weight ratio of the electrocoating resin based on the weight of the inorganic glass particles or the weight ratio of the electrocoating resin based on the total weight of the inorganic particles and inorganic glass particles falls within a predetermined range, they tend to provide a heat releasing product having desired concave portions on the surface thereof.

Regarding the paint composition for heat releasing products according to still another embodiment of the present invention, the inorganic glass particles preferably have an average particle diameter of about 3 μm or less.

Regarding the paint composition for heat releasing products according to still another embodiment of the present invention, the inorganic particles preferably have an average particle diameter of about 3 μm or less and the inorganic glass particles preferably have an average particle diameter of about 3 μm or less.

In the case where the average particle diameters of the inorganic glass particles and inorganic particles are small enough, the size of the particles tends to be uniform because they are less likely to include larger particles. In this case, the flow of the coat film is less likely to be locally disturbed during the electrocoating. Therefore, the path formation tends to successfully progress, possibly resulting in the formation of concave portions on the surface of the resulting heat releasing product.

Thus, the paint compositions for heat releasing products according to the embodiments of the present invention tend to achieve uniform distribution of the inorganic glass particles and the inorganic particles because the inorganic glass particles and the inorganic particles are small. This presumably facilitates the formation of concave portions on the surface of the resulting heat releasing product.

Moreover, in the case where the inorganic glass particles are small, concave portions on the surface of the heat releasing product tend not to be filled with the softened inorganic glass particles during the firing, possibly resulting in successful formation of concave portions on the surface of the heat releasing product.

In addition, in the case where the inorganic particles are also small enough, the solid-state inorganic particles are dispersed in the inorganic glass particles which are softened in a liquid state during the firing. At this time, in the case where the inorganic particles are small, the concave portions on the surface of the heat releasing product tend not to be filled with the composite particles of the softened inorganic glass particles and the inorganic particles because the composite particles have a high viscosity and poor flowability in comparison with the case where the inorganic particles are large.

Moreover, the inorganic glass particles and the inorganic particles tend to be stabilized in a solution of the paint composition for heat releasing products during the electrocoating presumably due to such small average particle diameters of the inorganic glass particles and inorganic particles.

The smaller the diameters of the particles, the more stable the particles in the paint solution. This is indicated by Stokes' formula shown below.

$$Vs = Dp^2 (\rho p - \rho f) g / 18 \eta$$

(Vs: terminal rate of particle [m/s], Dp: particle diameter [m], ρp: density of particles [kg/m$^3$], ρf: density of fluid [kg/m$^3$], g: gravitational acceleration [m/s$^2$], η: viscosity of fluid [Pa·s])

Therefore, the use of particles having small particle diameters as the inorganic glass particles and the inorganic particles tends to reduce the precipitation rate in the paint solution in the electrocoating, thereby possibly stabilizing the inorganic glass particles and the inorganic particles in the paint solution.

For the above reasons, this embodiment of the present invention tends to provide a heat releasing product having desired concave portions formed on the surface thereof.

Regarding the paint composition for heat releasing products according to still another embodiment of the present invention, the inorganic particles are preferably made of an oxide of a transition metal.

Regarding the paint composition for heat releasing products according to still another embodiment of the present invention, the inorganic glass particles preferably have a softening point of about 300° C. to about 1000° C.

Regarding the paint composition for heat releasing products according to still another embodiment of the present invention, the electrocoating resin is preferably an anionic electrocoating resin.

In order to facilitate formation of desired concave portions on the surface of the resulting heat releasing product, it is necessary to improve the stability of the paint composition, and also to suppress the precipitation of the particles. In the case where the stability of the paint composition is poor and a large amount of particles are precipitated, many particles drop on the horizontal surface portion of the metal base material, resulting in a higher solids content. As a result, the flow of the coat film is suppressed so that desired concave portions are less likely to be formed.

Regarding the paint composition for heat releasing products according to still another embodiment of the present invention, since an anionic electrocoating resin is used as the electrocoating resin, the compatibility between the surface charge of the inorganic particles and the surface charge of the inorganic glass particles is improved so that the anionic electrocoating resin functions to suppress the precipitation of the inorganic particles and the inorganic glass particles, and therefore the stability of the paint composition for heat releasing products tends to be improved. Accordingly, it becomes easier to successfully form a coat film.

Consequently, the embodiment of the present invention tends to provide a heat releasing product having desired concave portions formed on the surface thereof.

Regarding the paint composition for heat releasing products according to still another embodiment of the present invention, the electrocoating resin preferably includes a plurality of electrocoating resins each having a different $T_g$.

Due to these components, the paint composition for heat releasing products is less susceptible to the temperature at the time of application thereof. Presumably, this facilitates stable formation of a coat film in a comparatively wide temperature range, and thus possibly reduces the temperature dependence of the paint composition for heat releasing products upon application thereof.

Thus, the embodiment of the present invention tends to provide a heat releasing product having desired concave portions formed on the surface thereof.

Regarding the paint composition for heat releasing products according to still another embodiment of the present invention, the electrocoating resin preferably has a $T_g$ of about 5° C. to about 50° C.

In the case where the $T_g$ of the electrocoating resin is not lower than about 5° C., a coat film formed therefrom does not have a low viscosity, and tends not to flow. Consequently, once paths are formed on the coat film, the paths tend not to be easily filled with the coat film because the electrocoating resin around the paths tends not to be softened and not to flow during electrocoating. In addition, when the $T_g$ of the electrocoating resin is not higher than about 50° C., the electrocoating resin is not too hard at room temperature and tends to have a certain level of flowability. As a result, desired paths tend to be formed on the coat film.

Thus, since the $T_g$ of the electrocoating resin in the paint composition for heat releasing products according to the embodiment of the present invention falls within the above-mentioned range, the flowability of the electrocoating resin is appropriately adjusted. Presumably, this facilitates successful formation of paths during the electrocoating, possibly resulting in a heat releasing product in which desired concave portions are formed on the surface of the surface coating layer.

The paint composition for heat releasing products according to one embodiment of the present invention is preferably used as a paint composition for exhaust pipes for vehicle engines.

The following description will discuss one embodiment of the present invention.

First, a paint composition for heat releasing products of the present embodiment will be described.

The paint composition for heat releasing products of the present embodiment contains inorganic glass particles and an electrocoating resin.

The inorganic glass particles are preferably made of a low-melting-point glass having a softening point of about 300° C. to about 1000° C. Examples of the low-melting-point glass include, but are not particularly limited to, soda-lime glass, non-alkali glass, borosilicate glass, potash glass, crystal glass, titanium crystal glass, barium glass, boron glass, strontium glass, alumina silicate glass, soda zinc glass, and soda barium glass. Any of these glasses may be used alone, or two or more kinds of these may be mixed.

In the case where the above-mentioned low-melting point glass has its softening point in the range of about 300° C. to about 1000° C., a hard surface coating layer can be easily formed on the outer circumferential surface of the base material by fusing low-melting point glass, applying the paint composition to the outer circumferential surface of a base material (metal base material) (coating with the paint composition), and then performing a heating and firing treatment.

If the low-melting point glass has a softening point of not lower than about 300° C., the heat releasing product, when used as an exhaust pipe, does not easily soften, and thereby will not cause attachment of foreign matter. In addition, in the case where the softening point is not higher than about 1000° C., the heating treatment does not require too high a heating temperature of higher than about 1000° C. Therefore, it becomes easier to avoid deterioration of the base material caused by exposure to a high temperature in the heating treatment for forming the surface coating layer of the heat releasing product.

The softening point can be measured by using, for example, an automatic measuring apparatus of glass softening and strain points (SSPM-31) manufactured by OPT Corporation, based on a method according to JIS R 3103-1:2001.

Examples of the borosilicate glass include, but are not particularly limited to, $SiO_2$—$B_2O_3$—$ZnO$ glass and $SiO_2$—$B_2O_3$—$Bi_2O_3$ glass. The crystal glass refers to glass containing PbO, and examples thereof include, but are not particularly limited to, $SiO_2$—$PbO$ glass, $SiO_2$—$PbO$—$B_2O_3$ glass, and $SiO_2$—$B_2O_3$—$PbO$ glass. Examples of the boron glass include, but are not particularly limited to, $B_2O_3$—$ZnO$—$PbO$ glass, $B_2O_3$—$ZnO$—$Bi_2O_3$ glass, $B_2O_3$—$Bi_2O_3$ glass, and $B_2O_3$—$ZnO$ glass. Examples of the barium glass include, but are not particularly limited to, $BaO$—$SiO_2$ glass.

The average particle diameter of the inorganic glass particles is not particularly limited, but is desirably about 3 μm or less.

When the average particle diameter of the inorganic glass particles is not more than about 3 μm, the size of the particles tends to be uniform. In this case, the flow of the coat film is less likely to be locally disturbed during electrocoating. Therefore, the path formation tends to successfully progress, possibly resulting in the formation of concave portions on the surface of the resulting heat releasing product.

Moreover, in the case where the average particle diameter of the inorganic glass particles is not more than about 3 μm, concave portions on the surface of the heat releasing product tend not to be filled with the softened inorganic glass particles during the firing, possibly resulting in successful formation of concave portions on the surface of the heat releasing product.

Furthermore, in the case where the average particle diameter of the inorganic glass particles is not more than about 3 μm, the inorganic glass particles tend to be stabilized in a solution of the paint composition for heat releasing products during electrocoating.

The average particle diameter of the inorganic glass particles is desirably about 0.1 μm or more. When the average particle diameter of the inorganic glass particles is not less than about 0.1 μm, the glass component tends not to elute into the paint composition, and therefore is less likely to disturb the stability of the paint composition.

The paint composition for heat releasing products desirably contains inorganic particles.

As the inorganic particles, an oxide of a transition metal is desirably used, and more desirably, the oxide is at least one kind of oxides of manganese, iron, copper, cobalt, chromium and nickel.

Any of these inorganic particles may be used alone, or two or more kinds of these may be mixed together.

Since the oxides of these transition metals are materials having a high emissivity, infrared rays are strongly emitted when they are heated. Therefore, these oxides tend to contribute to improvement in the heat releasing characteristic utilizing radiant heat transfer.

The average particle diameter of the inorganic particles and the average particle diameter of the inorganic glass particles are not particularly limited, and one or both of the average particle diameter of the inorganic particles and the average diameter of the inorganic glass particles may be larger than about 3 μm; however, desirably, the average particle diameter of the inorganic particles is about 3 μm or less, and the average particle diameter of the inorganic glass particles is about 3 μm or less as well.

More desirably, the average particle diameter of the inorganic particles is about 1 μm or less, and the average particle diameter of the inorganic glass particles is about 1 μm or less. Furthermore desirably, the average particle diameter of the inorganic particles is about 0.9 μm or less, and the average particle diameter of the inorganic glass particles is about 0.8 μm or less.

In the case where both of the average particle diameter of the inorganic particles and the average diameter of the inorganic glass particles are not more than about 3 μm, the size of particles tends to be uniform. In this case, the flow of the coat film is less likely to be locally disturbed during electrocoating. Therefore, the path formation tends to successfully progress, possibly resulting in the formation of concave portions on the surface of the resulting heat releasing product.

Moreover, in the case where the average particle diameter of the inorganic glass particles is not more than about 3 μm, concave portions on the surface of the heat releasing product tend not to be filled with the softened inorganic glass particles during the firing, possibly resulting in successful formation of concave portions on the surface of the heat releasing product.

Moreover, in the case where the average particle diameter of the inorganic particles is not more than about 3 μm, the solid-state inorganic particles are dispersed in the softened inorganic glass particles in a liquid state during firing. In the case where the inorganic particles are small enough, the composite particles of the softened inorganic glass particles and the inorganic particles have a high viscosity and poor flowability in comparison with the case where the inorganic particles are large, and the composite particles tend not to fill in the concave portions on the surface of the heat releasing product. If the concave portions are filled therewith, the surface area of the surface coating layer is small, leading to a reduced emissivity.

Moreover, the average particle diameter of the inorganic particles is desirably about 0.1 μm or more. The average particle diameter of the inorganic glass particles is desirably about 0.1 μm or more.

The average particle diameter of the inorganic particles and the average particle diameter of the inorganic glass particles can be measured by using, for example, a Shimadzu nanoparticle size distribution measuring apparatus (SALD-7100) manufactured by SHIMADZU Corporation.

The desirable lower and upper limits of the amount of the inorganic glass particles blended are about 40% by weight and about 99.5% by weight, respectively, based on the total weight of the powder of the inorganic glass particles and the powder of the inorganic particles.

The inorganic glass particles correspond to a material that softens in the firing to form a matrix.

In the case where the amount of the inorganic glass particles blended is not less than about 40% by weight, since the amount of the inorganic glass particles is not too small based on the amount of the inorganic particles, a matrix tends to be formed sufficiently so that the inorganic glass particles tend to fill in gaps among the inorganic particles, and thus a surface coating layer with less voids tends to be formed. A surface coating layer with many voids has a reduced strength, failing to provide adhesion.

Moreover, in the case where the amount of the inorganic glass particles blended is not less than about 40% by weight, the amount of the inorganic glass particles that are brought into contact with a metal base material is not too small. In this case, a contact area between the inorganic glass particles softened in the firing and the metal base material is not so reduced that the surface coating layer tends to be sufficiently bonded onto the metal base material. Consequently, during firing or when a thermal impact is applied, part of the surface coating layer tends not to easily falloff (come off).

On the other hand, when the amount of the inorganic glass particles blended is not more than about 99.5% by weight, the amount of the inorganic particles is not so small that the resulting heat releasing product tends not to have a poor heat releasing characteristic.

The more desirable lower and upper limits of the amount of the inorganic glass particles blended are about 60% by weight and about 80% by weight, respectively.

The paint composition for heat releasing products may not contain the inorganic particles. Even in this case, as described with reference to FIGS. 2A to 2E, it becomes easier to provide a heat releasing product having a certain good level of heat releasing characteristic because of the electrocoating resin contained in the paint composition for heat releasing products.

In the case where the paint composition for heat releasing products contains inorganic particles, the desirable lower and upper limits of the amount of the inorganic particles blended are about 0.5% by weight and about 60% by weight, respectively, based on the total weight of the powder of the inorganic glass particles and the powder of the inorganic particles.

In the case where the amount of the inorganic particles blended is not less than about 0.5% by weight, since the amount of the inorganic particles is not too small relative to that of the inorganic glass particles, the resulting heat releasing product tends not to have a poor heat releasing characteristic. In addition, in the case where the amount of the inorganic particles blended is not more than about 60% by weight, a not so small amount of the inorganic glass particles tend to contribute to bonding between the surface coating layer and the metal base material. Consequently, it becomes easier to prevent the surface coating layer in the produced heat releasing product from falling off.

The more desirable lower and upper limits of the amount of the inorganic particles blended are about 20% by weight and about 40% by weight, respectively.

The electrocoating resin is preferably an anionic electrocoating resin.

The anionic electrocoating resin has an anionic group. The anionic group is a functional group that reacts with a base to form a salt. Examples of the anionic group include, but are not particularly limited to, a carboxyl group, a sulfonic acid group, and a phosphoric acid group.

Moreover, examples of the anionic electrocoating resin include, but are not particularly limited to, an acrylic resin, an epoxy resin, a polyurethane resin, a maleated oil, a polyester resin, and a polybutadiene resin.

Examples of the acrylic resin include, but are not particularly limited to, copolymer acrylic resins obtained by polymerizing a monomer composition including a carboxyl group-containing ethylenic polymerizable monomer and other ethylenic polymerizable monomers.

Examples of the carboxyl group-containing ethylenic polymerizable monomer include, but are not particularly limited to, (meth) acrylic acid, a (meth) acrylic acid dimer, crotonic acid, 2-(meth)acryloyloxyethylphthalic acid, 2-(meth) acryloyloxyethyl succinic acid, 2-(meth)acryloyloxyethyl acid phosphate, 2-(meth)acrylamide-2-methylpropane sulfonic acid, ω-carboxy-polycaprolactone mono(meth)acrylate, isocrotonic acid, α-hydro-ω-((1-oxo-2-propenyl)oxy) poly(oxy(1-oxo-1,6-hexanediyl), maleic acid, fumaric acid, itaconic acid, 3-vinylsalicylic acid, and 3-vinylacetyl salicylic acid. Any of these may be used alone, or two or more kinds of these may be used in combination.

Examples of the other ethylenic polymerizable monomer include, but are not particularly limited to, (meth)acrylates having an ester unit with one or more carbon atoms (for example, methyl(meth)acrylate, ethyl(meth)acrylate, n-propyl(meth)acrylate, isopropyl(meth)acrylate, n-butyl(meth) acrylate, isobutyl(meth)acrylate, t-butyl(meth) acrylate, 2-ethylhexyl(meth)acrylate, lauryl(meth)acrylate, phenyl (meth)acrylate, isobornyl(meth)acrylate, cyclohexyl(meth) acrylate, t-butylcyclohexyl(meth)acrylate, dicyclopentadienyl(meth)acrylate, dihydrodicyclopentadienyl(meth) acrylate, etc.), polymerizable amide compounds (for example, (meth)acrylamide, N-methylol(meth)acrylamide, N,N-dimethyl(meth)acrylamide, N,N-dibutyl(meth)acrylamide, N,N-dioctyl(meth)acrylamide, N-monobutyl(meth) acrylamide, N-monooctyl(meth)acrylamide, 2,4-dihydroxy-4'-vinylbenzophenone, N-(2-hydroxyethyl)(meth) acrylamide, etc.), polymerizable aromatic compounds (for example, styrene, α-methyl styrene, t-butyl styrene, parachlorostyrene, vinyl naphthalene, etc.), polymerizable nitriles (for example, (meth)acrylonitrile, etc.), α-olefins (for example, ethylene, propylene, etc.), vinyl esters (for example, vinyl acetate, vinyl propionate, etc.), dienes (for example, butadiene, isoprene, etc.), hydroxyethyl(meth)acrylate, hydroxypropyl(meth)acrylate, hydroxybutyl(meth)acrylate, allyl alcohols, (meth)acryl alcohols, and adducts of hydroxyethyl(meth)acrylate and ε-caprolactone. Any of these may be used alone, or two or more of these may be used in combination.

In the case where two or more kinds of (meth)acrylates are used in combination as the (meth)acrylate having an ester unit with one or more carbon atoms, (meth)acrylate having an ester unit with one or two carbon atoms is desirably included in the two or more kinds of (meth)acrylates.

In particular, when the paint composition for heat releasing products contains inorganic particles, the electrocoating resin is desirably an anionic electrocoating resin.

Figure 3:
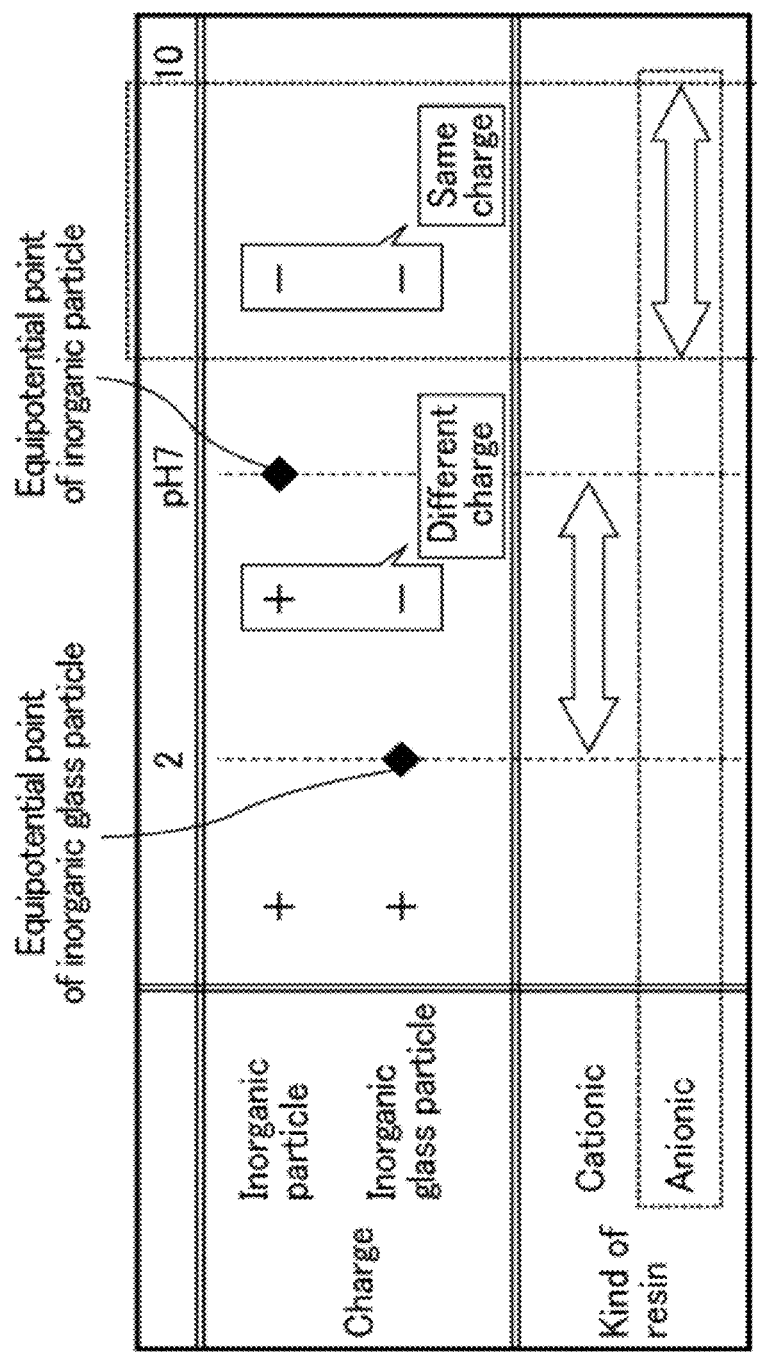
FIG. 3 is an explanatory drawing that illustrates a corresponding relationship between a pH value and an electric charge with respect to inorganic glass particles and inorganic particles according to the embodiment of the present embodiment.

Referring to FIG. 3, the following description will describe the reasons for this.

FIG. 3 is an explanatory drawing that illustrates a corresponding relationship between a pH value and an electric charge with respect to the inorganic glass particles and the inorganic particles according to the present embodiment.

As shown in FIG. 3, the equipotential point of the inorganic glass particles is about a pH value of 2. Therefore, under an environment having a pH value smaller than 2, the inorganic glass particles are charged positively, while under an environment having a pH value greater than 2, the inorganic particles are charged negatively.

Moreover, the equipotential point of the inorganic particles is about a pH value of 7. Therefore, under an environment having a pH value smaller than 7, the inorganic particles are charged positively, while under an environment having a pH value greater than 7, the inorganic particles are charged negatively.

In other words, under an acidic environment of pH 2 to 7, the electric charge possessed by the inorganic glass particles is different from the electric charge possessed by the inorganic particles, while under an alkaline environment, the electric charge possessed by the inorganic glass particles is the same as the electric charge possessed by the inorganic particles.

Therefore, in order to allow both the inorganic glass particles and the inorganic particles to deposit simultaneously, it is desirable to carry out electrocoating under an alkaline environment.

As described above, in the case of anionic electrocoating, since a base is used as a neutralizer to an anionic electrocoating resin, the electrocoating is carried out under an alkaline environment. On the other hand, in the case of cationic electrocoating, since an acid is used as a neutralizer to a cationic electrocoating resin, the electrocoating is carried out under an acidic environment.

Therefore, comparing the anionic electrocoating and the cationic electrocoating, the anionic electrocoating that is carried out under an alkaline environment is more desirable. That is, as the electrocoating resin contained in the paint composition for heat releasing products, an anionic electrocoating resin is more desirably used than a cationic electrocoating resin.

As described above, the electrocoating resin is desirably an anionic electrocoating resin but may be a cationic electrocoating resin. Compared to the use of an anionic resin, the use of a cationic electrocoating resin is not advantageous in terms of stability of the paint composition and easiness in forming concave portions, but it does not mean that the use of a cationic electrocoating resin is prohibited in the present embodiment.

Such a cationic electrocoating resin has a cationic group. The cationic group is a functional group that reacts with an acid to form a salt, and examples thereof include, but are not particularly limited to, an amino group, a sulfide group, and a phosphine group.

Moreover, examples of the cationic electrocoating resin include, but are not particularly limited to, an acrylic resin, an epoxy resin, and a polyester resin.

In the case where the epoxy resin is an amino group-containing epoxy resin, it can be produced by ring-opening the epoxy ring in a raw material epoxy resin molecule through a reaction with an amine such as a primary amine, a secondary amine, or a tertiary amine.

Examples of the raw material epoxy resin include, but are not particularly limited to, polyphenol polyglycidyl ether-type epoxy resins that are reaction products between epichlorohydrin and a polycyclic phenolic compound such as a bisphenol A-type epoxy resin, a bisphenol F-type epoxy resin, a bisphenol S-type epoxy resin, phenol novolac, orcresol novolac; and oxazolidonering-containing epoxy resins that are obtained by the reaction of epichlorohydrin and a bisurethane compound such as a diisocyanate compound optionally having an NCO group blocked with a lower alcohol such as methanol, ethanol or the like.

Examples of the amine include, but are not particularly limited to, butylamine, octylamine, diethylamine, dibutylamine, methylbutylamine, monoethanolamine, diethanolamine, N-methylethanolamine, a triethylamine acid salt, an N,N-dimethylethanolamine acid salt, and a ketimine-blocked amino group-containing polyamine.

The ketimine-blocked amino group-containing polyamine refers to an amine in which an amino group is blocked with ketimine. Examples of the ketimine-blocked amino group-containing polyamine include polyamines such as aminoethylethanol amine, diethylenetriamine, dipropylenetriamine, dibutylenetriamine, and triethylenetetramine in which an amino group is converted to ketimine by the reaction with a ketone such as acetone, methylethylketone, or methylisobutylketone (for example, ketimine-blocked primary amino group-containing secondary amines such as diethylenetriaminemethylisobutylketimine and aminoethylethanolaminemethylisobutylketimine).

Examples of the acrylic resins include, but are not particularly limited to, those resins obtained by allowing an amine to react with the oxysilane ring of the resultant product obtained by copolymerizing (meth)acrylate, hydroxyl group-containing (meth)acrylate monomers (for example, products of the addition reaction between ε-caprolactone and a hydroxyl group-containing (meth)acrylester such as 2-hydroxyethyl (meth)acrylate, 2-hydroxypropyl(meth)acrylate or 2-hydroxyethyl(meth)acrylate), and other acrylic and/or non-acrylic monomer(s), and those resins obtained by copolymerizing an acrylic monomer having an amino group without using glycidyl(meth)acrylate.

The electrocoating resin may be only one electrocoating resin, or may include a plurality of electrocoating resins.

Moreover, the organic binder in the paint composition for heat releasing products may be composed only of the electrocoating resin or may include an organic binder other than the electrocoating resin. Examples of the organic binder other than the electrocoating resin include polyvinyl alcohol, methylcellulose and ethylcellulose. Any of these may be used alone, or two or more kinds of these may be used in combination.

The electrocoating resin desirably includes electrocoating resins each having a different $T_g$.

During the electrocoating, the flowability of the electrocoating resin varies at a temperature in the vicinity of its $T_g$. However, in the case where the electrocoating resin includes electrocoating resins each having a different $T_g$, it becomes easier to avoid an abrupt change in the flowability of the electrocoating resin. When the electrocoating resin includes electrocoating resins each having a different $T_g$, the paint composition is less susceptible to influences from the temperature at the time of application thereof. Presumably, this facilitates stable formation of a coat film in a comparatively wide temperature range, and possibly reduces the temperature dependence of the paint composition for heat releasing products upon application thereof.

Thus, it becomes easier to obtain an exhaust pipe having a surface coating layer with desired concave portions formed on the surface thereof.

Moreover, the $T_g$ of the electrocoating resin is desirably about 5° C. to about 50° C.

In the case where the $T_g$ of the electrocoating resin is not lower than about 5° C., a coat film formed therefrom does not have a low viscosity, and the resin tends not to easily flow. Consequently, once paths are formed on the coat film during the electrocoating, the electrocoating resin around the paths tends not to be softened and not to flow so that the paths tend not to be filled with the coat film. For this reason, desired concave portions tend to be formed, and therefore a surface coating layer having a high emissivity is likely to be formed. On the contrary, when the $T_g$ of the electrocoating resin is not higher than about 50° C., the electrocoating resin is not too hard at room temperature and tends to have a certain level of flowability. As a result, desired paths tend to be formed on the coat film. Therefore, desired concave portions tend to be formed, and in turn, a surface coating layer having a high emissivity tends to be formed. In addition, in the case where the $T_g$ of the electrocoating resin is not higher than about 50° C., the flowability of the electrocoating resin is not so poor that inner moisture tends to be easily removed in the process of drying and curing. Consequently, less time is required for the drying and curing, resulting in good working efficiency and low costs.

However, the $T_g$ of the electrocoating resin may fall outside the range of about 5° C. to about 50° C. In the case of using a plurality of electrocoating resins, the electrocoating resins may include an electrocoating resin having a $T_g$ outside the range of about 5° C. to about 50° C., or each of the electrocoating resins may have a $T_g$ outside the range of about 5° C. to 5 about 0° C.

Additionally, $T_g$ refers to a glass transition point, and can be measured by a DSC (Differential Scanning calorimeter) according to JIS K 7121: 1987.

The weight ratio of the electrocoating resin based on the total weight of the inorganic particles and the inorganic glass particles is desirably about 1.0 to about 3.5.

In the case where the paint composition for heat releasing products does not contain inorganic particles, the weight ratio of the electrocoating resin relative to the weight of the inorganic glass particles is desirably about 1.0 to about 3.5.

In the case where the weight ratio of the electrocoating resin based on the total weight of the inorganic particles and the inorganic glass particles is not more than about 3.5 (including the case where the weight of the inorganic particles is 0), the amount of the electrocoating resin contained in the paint composition for heat releasing products is not too large, and the volume ratios of the inorganic particles and inorganic glass particles are not so low. In this case, the inorganic particles and the inorganic glass particles are less likely to be separated from one another in the coat film. Consequently, the inorganic particles and the inorganic glass particles tend to be combined with each other; therefore, even when the electrocoating resin is heated and burned out in the process of degreasing the electrocoating resin, the inorganic particles and the inorganic glass particles tend not to easily collapse and fall off. Thus, it becomes easier to obtain a surface coating layer having a high emissivity.

In addition, in the case where the weight ratio of the electrocoating resin based on the total weight of the inorganic particles and the inorganic glass particles is not less than about 1.0 (including the case where the weight of the inorganic particles is 0), since the amount of the electrocoating resin is not too small, the densities of the inorganic particles and inorganic glass particles contained in the paint composition for heat releasing products are not too high. Therefore, the coat film deposited by the electrocoating is less likely to contain a large amount of solids (particles). Consequently, due to good flowability of the coat film during application of the electrocoating current, the path formation and coat film formation around the paths tend to successfully progress. As a result, desired concave portions tend to be formed on the surface of a heat releasing product. Thus, it becomes easier to obtain a surface coating layer having a high emissivity. Moreover, when the amounts of the inorganic particles and inorganic glass particles contained in the paint composition for heat releasing products are not too great, the organic particles and the organic glass particles tend not to be precipitated, and the particle concentration in the paint solution tends not to change. Therefore, the coating conditions are less likely to change. Accordingly, this presumably enables to form a coat film in a stable manner. Moreover, it becomes easier to avoid the problem of sedimentation of the particles onto the bottom surface of the electrocoating vessel.

However, the weight ratio of the electrocoating resin based on the total amount of the inorganic particles and the inorganic glass particles may fall outside the range of about 1.0 to about 3.5. Moreover, in the case where the paint composition for heat releasing products does not contain inorganic particles, the weight ratio of the electrocoating resin based on the weight of the inorganic glass particles may fall outside the range of about 1.0 to about 3.5.

In addition to the inorganic glass particles, the inorganic particles and the organic binder, the paint composition for heat releasing products may contain a pigment, a neutralizer, a curing agent, a dispersion medium, various other additives, and the like.

Examples of the pigment include a colorant pigment, an extender pigment, and a rust-proofing pigment.

Examples of the colorant pigment include Titanium White, carbon black, iron oxide red, Phthalocyanine Blue, Phthalocyanine Green, monoazo yellow, disazo yellow, Benzimidazolone Yellow, Quinacridone Red, monoazo red, polyazo red, and Perylene Red.

Examples of the extender pigment include kaolin, talc, aluminum silicate, calcium carbonate, mica, clay, and silica.

Examples of the rust-proofing pigment include zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate, aluminum phosphomolybdate, and aluminum zinc phosphomolybdate.

Examples of the neutralizer for the anionic electrocoating resin include bases, such as ammonia, organic amines, and alkali metal hydroxides.

Examples of the organic amines include diethylamine, ethylethanol amine, diethanol amine, monoethanol amine, monopropanol amine, isopropanol amine, ethylaminoethyl amine, hydroxyethylamine, and diethylenetriamine.

Examples of the alkali metal hydroxides include sodium hydroxide and potassium hydroxide.

Examples of the neutralizer for the cationic electrocoating resin include acids, such as hydrochloric acid, nitric acid, phosphoric acid, formic acid, acetic acid, and lactic acid.

Examples of the curing agent for the anionic electrocoating resin include a melamine resin and a blocked polyisocyanate.

Examples of the curing agent for the cationic electrocoating resin include a blocked polyisocyanate.

Such a blocked polyisocyanate is obtained by blocking polyisocyanate using a blocking agent. Polyisocyanate refers to a compound having two or more isocyanate groups in one molecule.

Examples of the dispersion medium include water, and organic solvents such as methanol, ethanol and acetone.

Examples of the various other additives include an additive to be blended so as to carry out the electrocoating, a surfactant, an antioxidant, and an ultraviolet ray absorbing agent.

Examples of the additive to be blended so as to carry out the electrocoating include an additive for controlling a zeta potential and/or adjusting the resistance of the solution, and a stabilizer for ensuring the dispersibility of the inorganic glass particles and/or inorganic particles.

In the present embodiment, the paint composition for heat releasing products can be used as a paint composition for exhaust pipes for vehicle engines. More specifically, such heat releasing products may be exhaust pipes for vehicle engines (herein, also simply referred to as exhaust pipes).

The following description explains a method for producing an exhaust pipe of the present embodiment.

The following description is based on an example in which the paint composition for heat releasing products contains inorganic particles.

(1) Production of Paint Composition for Heat Releasing Product

By dry mixing the above inorganic glass particles and inorganic particles, a mixed powder is produced.

More specifically, the powder of the inorganic glass particles and the powder of the inorganic particles are prepared so as to have predetermined characteristics (e.g. particle size, shape), and by dry mixing the respective powders at a predetermined blending ratio, a mixed powder is prepared.

By adding the electrocoating resin and various additives such as water to the mixed powder thus prepared and mixing them, a paint composition for heat releasing products is produced.

(2) Preparation of Base Material

A base material made of a metal (metal base material) is used as a starting material, and the metal base material is subjected to a washing treatment so as to remove impurities from the surface thereof.

Examples of the material for the base material include, but are not particularly limited to, metals such as stainless steel, steel, iron and copper, and nickel alloys such as Inconel, Hastelloy and Invar. Since these metal materials have high thermal conductivity, these tend to contribute to an improvement in heat releasing characteristic of a resulting exhaust pipe.

The washing treatment is not particularly limited, and conventionally known washing treatments can be used, and for example, a method such as ultrasonic washing in an alcohol solvent may be used.

After the washing treatment, if necessary, a roughening treatment may be carried out on the surface of the base material so as to increase the specific surface area of the base material or to adjust the roughness of the surface of the base material. For example, roughening treatments, such as a sand-blasting treatment, an etching treatment and a high-temperature oxidizing treatment, may be carried out. Any of these treatments may be carried out alone, or two or more of these may be carried out in combination.

(3) Formation of Coat Film

The paint composition for heat releasing products produced in the process (1) is applied to the surface of the metal base material prepared in the process (2) by electrocoating. More specifically, the metal base material and an electrode plate are placed in the paint composition for heat releasing products, and a voltage is applied so that one of the metal base material and the electrode plate serves as an anode and the other serves as a cathode.

Then, the electrocoating resin that is in a soluble state carries the inorganic glass particles and the inorganic particles to the surface of the metal base material (see FIG. 2A). When brought into contact with the surface of the metal base material, the electrocoating resin changes from its soluble state to its insoluble state, and is deposited on the surface of the metal base material (see FIGS. 2B and 2C). At this time, paths through which the soluble electrocoating resin is allowed to pass are formed in the coat film (see FIGS. 2B and 2C). These paths are formed when the oxygen gas, which is generated when the electrocoating resin is brought into contact with the surface of the metal base material, pushes a portion of the already formed coat film aside to proceed into the paint solution.

The electrocoating process is desirably carried out normally by applying a voltage of about 50 V to about 450 V at a bath temperature of about 10° C. to about 45° C. for about 15 seconds to about 20 minutes, and the voltage is more desirably about 60 V to about 300 V, the bath temperature is more desirably about 26° C. to about 32° C., and the current-applying time is more desirably about 30 seconds to about 10 minutes. Moreover, the solid component concentration of the paint composition for heat releasing products is desirably about 5% by weight to about 25% by weight, and the pH of the paint composition for heat releasing products is desirably about 8.0 to about 9.5.

In the case where the voltage is not more than about 300 V, the formed coat film of the paint composition for heat releasing products on the surface of the body to be coated (metal base material) tends not to be re-dissolved due to heat generated on the surface of the body to be coated. As a result, the film thickness of the coat film tends to grow thick enough by the voltage application. In addition, in the case where the voltage is not less than about 60 V, since the load voltage is not too low, its force that attracts the electrocoating resin onto the body to be coated (metal base material) tends not to be too weak, and therefore tends to provide a sufficient thickness of a coat film of the paint composition for heat releasing products. As a result, it becomes easier to obtain a surface coating layer having a high emissivity.

When the bath temperature is not higher than about 32° C., the electrocoating resin in the paint solution is less likely to deteriorate due to heat. As a result, the frequency of replacement of the electrocoating resin due to deterioration of the paint composition does not increase, leading to a reduction in production costs. In addition, in the case where the bath temperature is not lower than about 26° C., since the activity of the electrocoating resin is not lowered and the reaction rate on the surface of the body to be coated (metal base material) is not reduced, it becomes easier to obtain a coat film of the paint composition for heat releasing products. As a result, it becomes easier to obtain a surface coating layer having a high emissivity.

In the case where the current-applying time is not more than about 10 minutes, this current-applying time is not too long, and therefore solid components in the paint composition for heat releasing products tend not to be sedimented. Consequently, a difference in film thicknesses of a coat film of the paint composition for heat releasing products tends not to be generated between the perpendicular surface and horizontal surface of the body to be coated (metal base material). As a result, it becomes easier to obtain a surface coating layer having a uniform heat releasing characteristic over the entire surface. In addition, in the case where the current-applying time is not less than about 30 seconds, the current-applying time is not too short, and therefore the growth of the coat film is not blocked halfway. As a result, it becomes easier to obtain a sufficient thickness of a coat film of the paint composition for heat releasing products. Therefore, it becomes easier to obtain a surface coating layer having a high emissivity.

In the case where the solids content of the paint composition for heat releasing products is not more than about 25% by weight, the flowability of the coat film deposited by electrocoating is not so low. In this case, heat and bubbles, which are generated on the surface of the body to be coated (metal base material), tend to be easily removed. Since local temperature rise does not arise, the coat film tends not to be re-dissolved in the paint solution and bubbles remaining in the coat are less likely to be thermally expanded upon heating to cause bumping. As a result, it becomes easier to avoid deterioration of the surface state of a coat film formed from the paint composition for heat releasing products. Thus, it becomes easier to obtain a surface coating layer having a high emissivity. In addition, In the case where the solids content of the paint composition for heat releasing products is not less than about 5% by weight, the deposition on the body to be coated (metal base material) is mainly made of not only the electrocoating resin, and certain amounts of the inorganic glass particles and the inorganic particles are attached to the body to be coated (metal base material) so that a coat film of the paint composition for heat releasing products tends to be formed. Consequently, a surface coating layer formed on the metal base material by the firing tends not to be thin. Thus, it becomes easier to obtain a surface coating layer having a high emissivity.

In the case where the pH of the paint composition for heat releasing products is not more than about 9.5, a coat film formed from the paint composition for heat releasing products tends to be deposited. As a result, it becomes easier to avoid an increase in power consumption required for electrocoating of the paint composition for heat releasing products, that is, to avoid a waste of energy. This can be explained based on a coat film formation mechanism by electrocoating that due to a pH change caused by an electric reaction on the surface of the body to be coated (metal base material), the electrocoating resin is changed from its soluble state to its insoluble state to be deposited. In the case where the pH of the paint composition for heat releasing products is not more than about 9.5, since the pH is not excessively high, the electrocoating resin tends not to remain in its soluble state and not to be deposited, or a coat film once deposited tends not to be re-dissolved in the paint solution, when the pH is lowered by the electric reaction. Moreover, in the case where the pH of the paint composition for heat releasing products is not more than about 9.5, the coat film state of the paint composition for heat releasing products tends not to become unstable due to bubbling. As a result, the coating film formed contains less voids, and therefore the surface coating layer tends not to have low strength, and tends to provide high adhesion.

In addition, in the case where the pH of the paint composition for heat releasing products is not less than about 8.0, the pH value is not in the vicinity of pH at which the electrocoating resin itself changes from its insoluble state to its soluble state. Namely, the state of the electrocoating resin is not on a border between the soluble state and the insoluble state. Therefore, the electrocoating resin does not become soluble or insoluble due to a fluctuation of the pH so that the electrocoating resin tends to be stable in the solution. As a result, the frequency of replacement of the electrocoating resin due to deterioration of the paint composition tends not to increase, leading to a reduction in production costs.

In the case of using an anionic electrocoating resin as the electrocoating resin, the metal base material is used as an anode, and the electrode plate is used as a cathode. On the other hand, in the case of using a cationic electrocoating resin as the electrocoating resin, the metal base material is used as a cathode, and the electrode plate is used as an anode; thus, a voltage is applied thereto.

(4) Drying and Curing

The metal base material on which the paint composition for heat releasing products has been applied in the process (3) is heated to a predetermined temperature so that the coat film of the paint composition for heat releasing products formed on the surface of the metal base material is dried and cured. At this time, as moisture, volatile resin additives and the like are evaporated through the paths formed in the process (3), preliminary portions for concave portions are formed on the surface of the coat film (see FIG. 2D). The preliminary portions for concave portions herein refer to concave areas which are formed on the surface of the coat film, and formed as a result of deformation of the paths while drying and curing the coat film.

In the present process, the heating temperature is desirably about 100° C. to about 200° C., more desirably about 110° C. to about 190° C., and furthermore desirably about 120° C. to about 180° C.

In the case where the heating temperature is not higher than about 200° C., since the temperature is not excessively high, the coat film of the paint composition for heat releasing products tends not to be cured too much. Thus, it becomes easier to avoid a waste of energy. In addition, in the case where the heating temperature is not lower than about 100° C., the drying and curing tends not to be insufficient, and moisture or the solvent tends not to remain in the coat film. As a result, it becomes easier to avoid bumping caused by the residual moisture or solvent upon heating in the degreasing processor the firing process, and thereby to avoid a rupture of the coat film which may cause partially unattached portions (portions where voids are present in the surface coating layer). Moreover, since the coat film of the paint composition for heat releasing products tends to be sufficiently cured, the adhesion between the coat film and the metal base material tends not to be low, and therefore the coat film and the metal base material tend not to separate from each other upon handling.

Moreover, the present process is desirably maintained at the heating temperature for a predetermined period of time, and the maintaining time is desirably in a range of about 5 minutes to about 90 minutes.

When the maintaining time is not longer than about 90 minutes, the coat film of the paint composition for heat releasing products tends not to be cured too much. Thus, it becomes easier to avoid a waste of time. In addition, when the maintaining time is not less than about 5 minutes, the drying and curing of the coat film of the paint composition for heat releasing products tend not to be insufficient, and moisture or the solvent tends not to remain in the coat film. As a result, it becomes easier to avoid bumping caused by the residual moisture or solvent upon heating in the degreasing processor the firing process, and thereby to avoid a rupture of the surface coating layer which may cause partially unattached portions (portions where voids are present in the surface coating layer). Moreover, since the coat film of the paint composition for heat releasing products tends to be sufficiently cured, the adhesion between the coat film and the metal base material tends not to be low, and therefore the coat film and the metal base material tend not to separate from each other upon handling.

(5) Degreasing

After the process (4), the metal base material is heated at a temperature of not lower than the burning-out temperature of the electrocoating resin so that the electrocoating resin is burned out. As a result, the volume of the coat film is contracted, and concave portions that correspond to the preliminary concave portions formed on the surface of the coat film in the process (4) tend to be formed on the surface of the coat film (see FIG. 2E).

The burning-out temperature of the electrocoating resin refers to a temperature at which the weight of the electrocoating resin is reduced by about 50%, and this temperature can be measured by a TG/DTA simultaneous measuring apparatus.

Although it also depends on the kind of the electrocoating resin blended thereto, the heating temperature in this process is desirably about 300° C. to about 600° C., more desirably about 325° C. to about 550° C., and furthermore desirably about 350° C. to about 500° C.

In the case where the heating temperature is not higher than about 600° C., since the temperature is not excessively high, the inorganic glass particles tends not to be softened before completion of the degreasing of the electrocoating resin. As a result, it becomes easier to avoid burning of the electrocoating resin and generation of a gas after the inorganic glass particles have softened to start the formation of a matrix, and thereby to avoid bumping. Consequently, unattached portions tend not to occur. In addition, in the case where the heating temperature is not lower than about 300° C., the degreasing of the electrocoating resin tends not to be insufficient, and therefore not to cause residual resin components in the coat film. For this reason, upon a temperature rise in the following process (6) Firing, bumping is less likely to be caused so that unattached portions tend not to occur.

The temperature is preferably controlled in the above heating temperature range for a predetermined period of time, and the maintaining time is desirably about 5 minutes to about 90 minutes.

As the maintaining time, about 90 minutes is enough to sufficiently complete the degreasing of the electrocoating resin, and a maintaining time is not longer than about 90 minutes is unlikely to be a waste of time. In addition, in the case where the maintaining time is not less than about 5 minutes, the degreasing of the electrocoating resin tends not to be insufficient, and therefore not to cause residual resin components in the coat film. For this reason, upon a temperature rise in the following process (6) Firing, the electrocoating resin tends not to be burned in the softened inorganic glass particles, and therefore not to generate a gas. Therefore, bumping is less likely to be caused so that holes through which the metal base material is exposed are unlikely to be formed on the surface of the surface coating layer. Thus, it becomes easier to obtain a surface coating layer having a high emissivity.

Moreover, the temperature rising rate from the heating temperature in the process (4) Drying and curing to the heating temperature in the present process is desirably about 1.7° C. to about 60.0° C./minute, more desirably about 2.0° C. to about 30.0° C./minute, and furthermore desirably about 3.0° C. to about 15.0° C./minute.

In the case where the temperature rising rate is not higher than about 60.0° C./minute, bumping of the resin component is less likely to be caused so that unattached portions tend not to occur. On the other hand, in the case where the temperature rising rate is not less than about 1.7° C./minute, less time is required for the temperature rise, possibly making it possible to avoid a waste of time.

(6) Firing

After the process (5), the metal base material is heated to a temperature of not lower than the softening point of the inorganic glass particles.

As a result of this process, the metal base material tends to firmly adhere to the inorganic glass particles so that a surface coating layer that firmly adheres to the metal base material tends to be formed. Moreover, since the inorganic glass particles are fused, the reduction rate of the film thickness of the coat film becomes great so that a surface coating layer with concave portions on its surface can be more easily formed (see FIG. 2E).

Furthermore, when the inorganic particles are present in the coat film, the flowability of the softened inorganic glass particles is low, which suppresses the flow of the coat film around concave portions. As a result, a surface coating layer with concave portions on its surface can be easily formed. In contrast, in the case where no inorganic particles are present in the coat film, flow of the coat film around concave portions is not suppressed, which makes it difficult to form a surface coating layer with concave portions on its surface, in comparison with the case where the inorganic particles are present in the coat film.

Although it also depends on the kind of the blended inorganic glass particles, the heating temperature in the present process is desirably about 500° C. to about 1000° C., more desirably about 600° C. to about 950° C., and furthermore desirably about 700° C. to about 900° C.

In the case where the heating temperature is not higher than about 1000° C., the metal base material tends not to deteriorate due to exposure to the high temperature. In addition, in the case of a heating temperature of not lower than about 500° C., the softening of the inorganic glass particles tends to be sufficient to cause sufficient sintering. As a result, the coating of the paint composition for heat releasing products tends to be densified, possibly resulting insufficient adhesion between the metal base material and the surface coating layer.

Additionally, the heating temperature in the present process is higher than the heating temperature in the process (5) Degreasing.

Moreover, the present process is desirably maintained at the heating temperature for a predetermined period of time, and the maintaining time is desirably in a range of about 1 minute to about 30 minutes.

When the maintaining time is not longer than about 30 minutes, the metal base material tends not to deteriorate. In addition, when the maintaining time is not less than 1 minute, the softening of the inorganic glass particles tends to be sufficient, resulting in a densified coating of the paint, and thereby possibly resulting in sufficient adhesion between the metal base material and the surface coating layer.

Moreover, the temperature rising rate from the heating temperature in the process (5) Degreasing to the heating temperature in the present process is desirably about 3.3° C. to about 100.0° C./minute, more desirably about 4.0° C. to about 50.0° C./minute, and furthermore desirably about 5.0° C. to about 25.0° C./minute.

In the case where the temperature rising rate is not higher than about 100.0° C./min, although due to high heat capacity of the metal base material, heat is absorbed, the entire portion of the metal base material tends to be evenly heated. In addition, in the case where the temperature rising rate is not less than about 3.3° C./minute, less time is required for the temperature rise, possibly making it possible to avoid a waste of time.

By carrying out the above-mentioned processes, an exhaust pipe having a surface coating layer formed on the surface of a metal base material can be produced.

Figure 4:
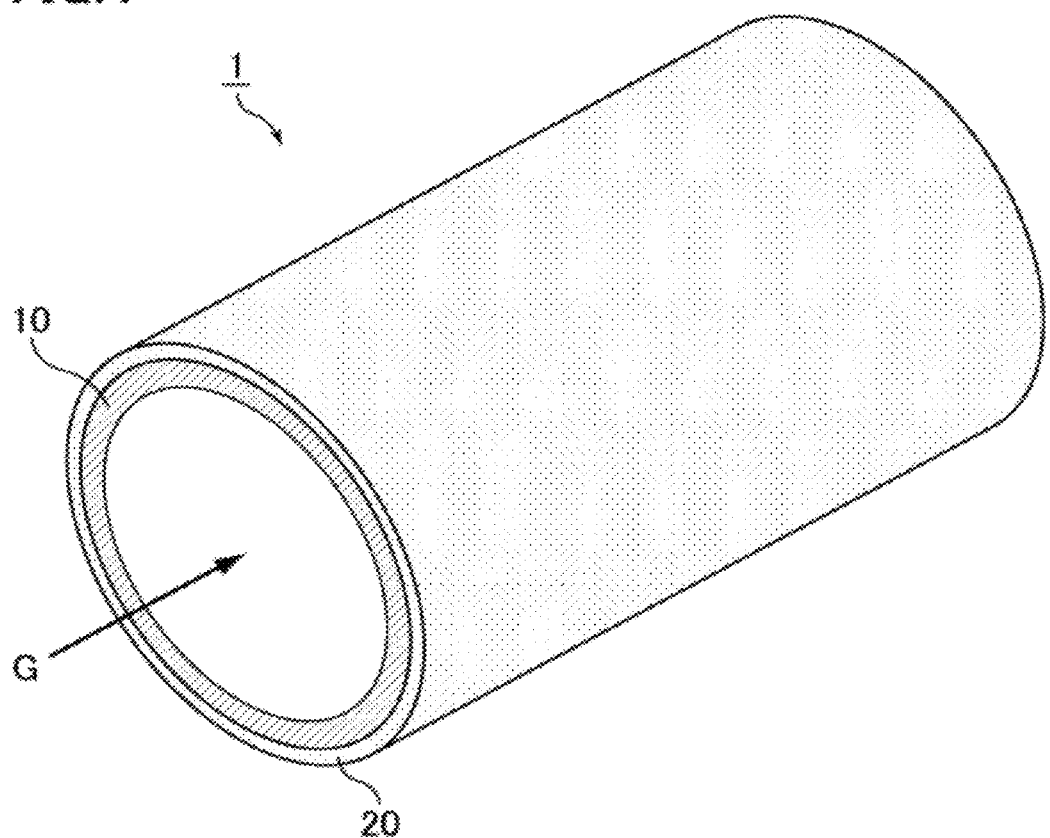
FIG. 4 is a perspective drawing that schematically illustrates an exhaust pipe according to the embodiment of the present embodiment.
Figure 5:
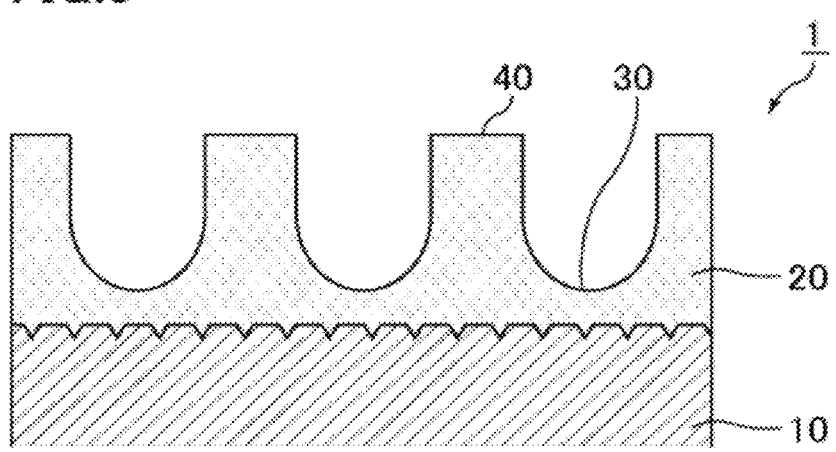
FIG. 5 is a partially expanded cross-sectional drawing that schematically illustrates a cross-section obtained by cutting the exhaust pipe shown in FIG. 4 in its longitudinal direction.
Figure 6:
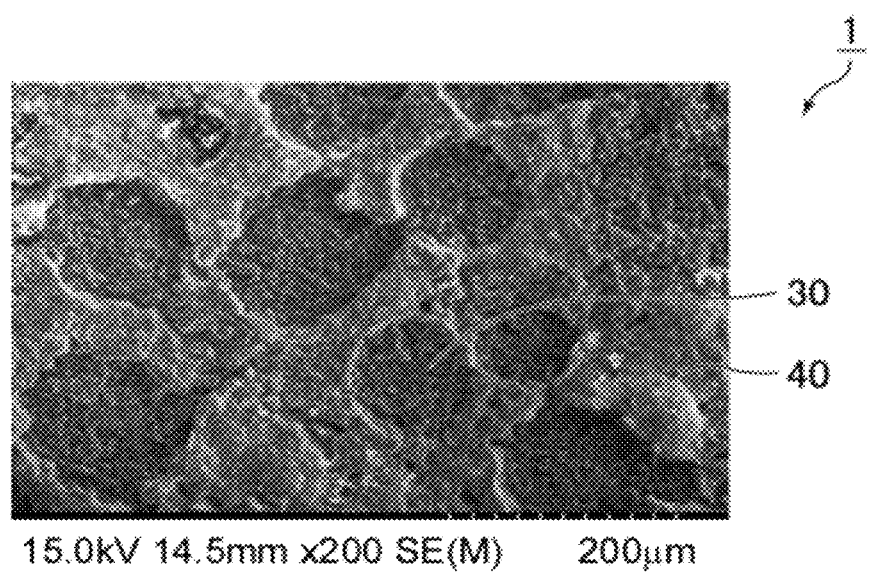
FIG. 6 is a photograph of the exhaust pipe of FIG. 4, taken in the direction perpendicular to the surface of the base material.

Referring to FIGS. 4 to 6, the following description will explain an exhaust pipe having a surface coating layer formed on the surface of a metal base material.

FIG. 4 is a perspective drawing that schematically illustrates an exhaust pipe of the present embodiment.

FIG. 5 is a partially expanded cross-sectional drawing that schematically illustrates a cross-section obtained by cutting the exhaust pipe shown in FIG. 4 in its longitudinal direction.

FIG. 6 is a photograph of the exhaust pipe of FIG. 4, taken in the direction perpendicular to the surface of the base material.

In FIG. 4, exhaust gas is indicated by G and the flowing direction of the exhaust gas is indicated by the arrow.

The photograph of FIG. 6 was taken by an electron microscope with an accelerating voltage of 15.0 kV and a magnification of 200 times.

An exhaust pipe 1 shown in FIG. 4 is constituted by a substantially cylindrical metal base material 10 and a surface coating layer 20 with a predetermined thickness formed on the outer circumferential surface of the metal base material 10.

As shown in FIG. 5, on the surface of the metal base material 10, irregularities are formed. The surface roughness $Rz_{JIS}$ (JIS B 0601: 2001) on the outer circumferential surface of the metal base material having these irregularities formed thereon is desirably about 1.5 µm to about 15.0 µm.

In the case where the surface roughness $Rz_{JIS}$ of the outer circumferential surface of the metal base material is not less than about 1.5 µm, since the surface area of the metal base material is large enough, resulting in sufficient adhesion between the metal base material and the surface coating layer. In addition, in the case where the surface roughness $Rz_{JIS}$ of the outer circumferential surface of the metal base material is not more than about 15.0 µm, voids tend to be formed between the surface of the metal base material and the surface coating layer. This is presumably because when the surface roughness $Rz_{JIS}$ of the outer circumferential surface of the metal base material is not too high, the paint composition for heat releasing products tends to surely enter the concave portions of the irregularities formed on the surface of the metal base material.

The surface coating layer 20 is a layer that is formed by performing the respective treatments of drying, curing, degreasing and firing on the paint composition for heat releasing products applied onto the metal base material 10 by the electrocoating.

As shown in FIG. 5, the surface coating layer 20 is provided with concave portions 30 and flat portions 40 on the surface. The distance between the concave portions 30 on the surface coating layer 20 and the metal base material 10 is shorter than the distance between the flat portions 40 and the base material 10.

As shown in FIG. 6, the concave portions 30 on the surface coating layer 20 have a round shape when viewed in a direction perpendicular to the surface of the metal base material 10.

A mechanism of the formation of the concave portion 30 on the surface coating layer 20 is as follows:

In the electrocoating, the electrocoating resin that is in a soluble state carries the inorganic glass particles and the inorganic particles to the surface of the metal base material 10 (see FIG. 2A). When brought into contact with the surface of the metal base material 10, the electrocoating resin changes from its soluble state to its insoluble state, and thereby is deposited on the surface of the metal base material 10 (see FIGS. 2B and 2C). At this time, paths through which the soluble electrocoating resin is allowed to pass are formed in the coat film of the paint composition for heat releasing products (see FIGS. 2B and 2C). These paths are formed when the oxygen gas, which is generated when the electrocoating resin is brought into contact with the surface of the metal base material, pushes a portion of the already formed coat film aside to proceed into the paint solution.

Thereafter, when the coat film of the paint composition for heat releasing products is heated in the process (4) Drying and curing, moisture, volatile resin additives and the like are evaporated. At this time, as moisture, volatile resin additives and the like are evaporated through the paths, preliminary portions for concave portions are formed on the surface of the coat film (see FIG. 2D). Moreover, when the coat film is heated in the process (5) Degreasing so as to remove the electrocoating resin in the coat film, the electrocoating resin is burned out, resulting in a contraction of the volume of the coat film. Thereafter, by subjecting the coat film to the firing treatment in the process (6) Firing, the surface coating layer 20 with the concave portions 30 formed thereon is formed (see FIG. 2E).

So far, the paint composition for heat releasing products of the present embodiment is described.

The effects of the paint composition for heat releasing products of the present embodiment are listed below.

(1) The paint composition for heat releasing products of the present embodiment includes an electrocoating resin. The electrocoating resin in the paint composition for heat releasing products allows the paint composition for heat releasing products to be used for electrocoating. The paint composition for heat releasing products can be applied to a base material made of a metal (metal base material) by electrocoating. A coating layer formed by applying the paint composition for heat releasing products tends to be converted into a surface coating layer having convex portions on the surface thereof by heating. The mechanism of facilitating the formation of the surface coating layer having convex portions on the surface thereof is as described above.

Since the exhaust pipe produced by applying the paint composition for heat releasing products of the present embodiment to the base material tends to have concave portions formed on its surface coating layer, the exhaust pipe tends to have a large surface area and a high apparent emissivity. Accordingly, the radiant heat transfer of the exhaust pipe tends to be improved, which possibly leads to an excellent heat releasing characteristic of the exhaust pipe. Thus, the paint composition for heat releasing products of the present embodiment tends to provide an exhaust pipe having an excellent emissivity.

Moreover, due to the concave portions formed on the surface of the surface coating layer, the surface coating layer tends to be provided with many portions capable of serving as non-fixed ends for dispersing thermal stress. Therefore, the thermal stress due to thermal impact tends to be alleviated, thereby possibly preventing the surface coating layer from coming off. Thus, the paint composition for heat releasing products of the present embodiment tends to provide an exhaust pipe having excellent heat impact resistance.

(2) The paint composition for heat releasing products of the present embodiment contains inorganic particles.

Since the inorganic particles are a material having a high emissivity, infrared rays are released strongly when the paint composition is heated. This is indicated by Stefan-Boltzmann law represented by the following equation:

$$q = \epsilon \sigma (T_1^4 - T_2^4)$$

($\sigma$: Stefan-Boltzmann constant ... $5.67 \times 10^{-8}$ [W/m$^2$·K$^4$], q: heat flux [W/m$^2$], $\epsilon$: emissivity, $T_1$: heating unit temperature [K], $T_2$: heat receiving unit temperature [K])

Therefore, the exhaust pipe obtained by applying the paint composition for heat releasing products which contains inorganic particles is provided with a surface coating layer having a high emissivity because the inorganic particles in the surface coating layer emit infrared rays. Thus, the exhaust pipe tends to have an excellent heat releasing characteristic at high temperatures.

Moreover, the inorganic glass particles are softened during the firing so that its flowability becomes low to suppress the flow of the coat film around the concave portions. Presumably, this facilitates the formation of concave portions on the surface of the surface coating layer.

Presumably due to the reasons mentioned above, it becomes easier to obtain an exhaust pipe that is provided with a further improved heat releasing characteristic.

(3) The electrocoating resin in the paint composition for heat releasing products of the present embodiment has a weight ratio of about 1.0 to about 3.5 based on the total weight of the inorganic particles and the inorganic glass particles.

When the amount of the electrocoating resin contained in the paint composition for heat releasing products is not so large, the volume ratios of the inorganic particles and inorganic glass particles are not so low. In this case, the inorganic particles and the inorganic glass particles are less likely to be separated from one another in the coat film. Thus, the inorganic particles and the inorganic glass particles tend to be combined with each other; therefore, even when the electrocoating resin is heated and burned out during the degreasing of the electrocoating resin, the inorganic particles and the inorganic glass particles tend not to collapse and fall off.

In addition, in the case where the amount of the electrocoating resin contained in the paint composition for heat releasing products is not so small, the densities of the inorganic particles and inorganic glass particles contained in the paint composition for heat releasing products are too high. Therefore, the coat film deposited by the electrocoating is less likely to contain a large amount of solids (particles). Consequently, due to good flowability of the coat film during application of the electrocoating current, the path formation and coat film formation around the paths tend to successfully progress. As a result, desired concave portions also tend to be formed on the surface of the heat releasing product. Moreover, when the amounts of the inorganic particles and inorganic glass particles contained in the paint composition for heat releasing products are not so large, the inorganic particles and the inorganic glass particles tend not to be precipitated, and the particle concentration in the paint solution tends not to easily change. Therefore, the coating conditions are less likely to change. This presumably enables to form a coat film in a stable manner. Moreover, it becomes easier to avoid the problem of sedimentation of the particles onto the bottom surface of the electrocoating vessel.

If the weight ratio of the electrocoating resin based on the total weight of the inorganic particles and inorganic glass particles is about 1.0 to about 3.5, it becomes easier to provide an exhaust pipe having desired concave portions on the surface thereof.

(4) Regarding the paint composition for heat releasing products of the present embodiment, the inorganic particles have an average particle diameter of about 3 μm or less and the inorganic glass particles have an average particle diameter of about 3 μm or less.

In the case where the average particle diameters of the inorganic glass particles and inorganic particles are small enough, the size of the particles tends to be uniform because they are less likely to include larger particles. In this case, the flow of the coat film is less likely to be locally disturbed during the electrocoating. Therefore, the path formation tends to successfully progress, possibly resulting in the formation of concave portions on the surface of the heat releasing product.

Thus, the paint composition for heat releasing products of present embodiment tends to achieve uniform distribution of the inorganic glass particles and the inorganic particles since the inorganic glass particles and the inorganic particles are small. This presumably facilitates the formation of concave portions on the surface of the heat releasing product.

Moreover, in the case where the inorganic glass particles are small, the concave portions on the surface of the heat releasing product tend not to be filled with the softened inorganic glass particles during the firing process, possibly resulting in unsuccessful formation of concave portions on the surface of the heat releasing product.

In addition, in the case where the inorganic particles are also small enough, the solid-state inorganic particles are dispersed in the inorganic glass particles which are softened in a liquid state during the firing process. At this time, in the case where the inorganic particles are small, the concave portions on the surface of the heat releasing product tend not to be filled with the composite particles of the softened inorganic glass particles and the inorganic particles because the composite particles have a high viscosity and poor flowability in comparison with the case where the inorganic particles are large.

Moreover, the inorganic glass particles and the inorganic particles tend to be stabilized in a solution of the paint composition for heat releasing products during the electrocoating presumably due to such small average particle diameters of the inorganic glass particles and inorganic particles.

The smaller the diameters of the particles, the more stable the particles in the paint solution. This is indicated by Stokes' formula shown below.

$$Vs = Dp^2(\rho p - \rho f)g/18\eta$$

(Vs: terminal rate of particle [m/s], Dp: particle diameter [m], $\rho p$: density of particles [kg/m$^3$], $\rho f$: density of fluid [kg/m$^3$], g: gravitational acceleration [m/s$^2$], $\eta$: viscosity of fluid [Pa·s])

Therefore, the use of particles having small particle diameters as the inorganic glass particles and the inorganic particles tends to reduce the precipitation rate in the paint solution in the electrocoating, possibly stabilizing the inorganic glass particles and the inorganic particles in the paint solution.

Presumably due to the reasons mentioned above, it becomes easier to obtain an exhaust pipe having desired concave portions formed on the surface thereof.

(5) Regarding the paint composition for heat releasing products of the present embodiment, the electrocoating resin is an anionic electrocoating resin.

In order to facilitate the formation of desired concave portions on the surface of the heat releasing product, it is necessary to improve the stability of the paint composition, and also to suppress the precipitation of the particles. In the case where the stability of the paint composition is poor and a large amount of particles are precipitated, many particles drop on the horizontal surface portion of the metal base material. As a result, desired concave portions are unlikely to be formed.

Regarding the paint composition for heat releasing products of the present embodiment, since an anionic electrocoating resin is used as the electrocoating resin, the compatibility between the surface charge of the inorganic particles and the surface charge of the inorganic glass particles is improved so that the anionic electrocoating resin functions to suppress the precipitation of the inorganic particles and the inorganic glass particles, and therefore the stability of the paint composition for heat releasing products tends to be improved. Accordingly, it becomes easier to successfully form the coat film.

Presumably due to the above reason, it becomes easier to obtain an exhaust pipe having desired concave portions formed on the surface.

(6) In the paint composition for heat releasing products of the present embodiment, the electrocoating resin includes a plurality of electrocoating resins each having a different $T_g$.

Due to these components, the paint composition for heat releasing products is less susceptible to the temperature at the time of application thereof. Presumably, this facilitates stable formation of a coat film in a comparatively wide temperature range, and thus tends to reduce the temperature dependence of the paint composition for heat releasing products upon application thereof.

Presumably due to the above reason, it becomes easier to obtain an exhaust pipe having desired concave portions formed on the surface thereof.

(7) Regarding the paint composition for heat releasing products of the present embodiment, the electrocoating resin has a $T_g$ of about 5° C. to about 50° C.

In the case where the $T_g$ of the electrocoating resin is not lower than about 5° C., a coat film formed therefrom does not have a low viscosity, and tends not to flow. Consequently, once paths are formed on the coat film, the paths tend not to be easily filled with the coat film because the flow of the electrocoating resin around the paths tends not to be softened and not to flow during electrocoating. On the contrary, when the $T_g$ of the electrocoating resin is not higher than about 50° C., the electrocoating resin is not too hard at room temperature and tends to have a certain level of flowability. As a result, desired paths tend to be formed on the coat film.

Thus, since the $T_g$ of the electrocoating resin in the paint composition for heat releasing products of the present embodiment falls within the above-mentioned range, the flowability of the electrocoating resin is appropriately adjusted. Presumably, this facilitates to successful formation of paths during the electrocoating, possibly resulting in an exhaust pipe having desired concave portions formed on the surface of the surface coating layer.

EXAMPLES

The following description will discuss the present invention in more detail by means of examples; however, the present invention is not limited to these examples.

Example 1

(1) Production of Paint Composition for Heat Releasing Product.

As a powder of inorganic particles, a powder of metal oxides composed of $MnO_2$ powder (24 parts by weight), FeO powder (8 parts by weight), CuO powder (4 parts by weight) and CoO powder (4 parts by weight) was prepared. The inorganic particles had an average particle diameter of 0.8 μm.

Moreover, as a powder of inorganic glass particles, K807 ($SiO_2$—BaO—$B_2O_3$ glass powder, manufactured by Asahi Glass Co., Ltd., softening point: 720° C., 60 parts by weight) was prepared. The inorganic glass particles had an average particle diameter of 0.9 μm.

The powder of the inorganic particles and the powder of the inorganic glass particles were dry-mixed to prepare a mixed powder.

Moreover, to a reaction container were added a monomer composition, a solvent and a polymerization initiator, and the monomer composition was polymerized so that an anionic electrocoating resin was produced. Specifically, the added monomer composition was composed of ethyl acrylate (13 parts by weight), 2-ethylhexyl methacrylate (30 parts by weight), methyl methacrylate (31 parts by weight), acrylic acid (9 parts by weight), 2-hydroxyethyl acrylate (17 parts by weight) and N-methylolmethacryl amide (4 parts by weight); the added solvent was composed of isopropyl alcohol (IPA)

(54 parts by weight) and butyl cellosolve (15 parts by weight); and the added polymerization initiator was composed of azo-bisisobutylonitrile (3 parts by weight).

To the mixed powder, the anionic electrocoating resin (170 parts by weight), obtained by the polymerization, was added and mixed to prepare an organic binder.

Thereafter, to the mixture, pure water (1500 parts by weight) and other various additives were further added and mixed so that a paint composition for heat releasing products was produced.

The solids content of the paint composition for heat releasing products thus produced was 15% by weight.

By using a DSC (differential scanning calorimeter) (EX-STAR DSC6220, manufactured by SII-Nanotechnology Inc.), $T_g$ of the anionic electrocoating resin was measured to find that the $T_g$ was 25° C.

(2) Preparation of Metal Base Material

As a metal base material, a plate-shaped stainless base material (made of SUS430) having a width of 100 mm, a length of 100 mm and a thickness of 2 mm was prepared. This metal base material was subjected to ultrasonic washing in an alcohol solvent, and subsequently subjected to a sandblasting treatment so as to roughen the surface of the metal base material. The sandblasting treatment was carried out using $Al_2O_3$ abrasive grains of #100 for 10 minutes.

By using a surface-roughness measuring machine (HANDY SURF E-35B, manufactured by Tokyo Seimitsu Co., Ltd.), the surface roughness of the metal base material was measured to find that the surface roughness $Rz_{JIS}$ was 8.8 μm.

(3) Formation of Coat Film

The paint composition for heat releasing products (0.7 g) prepared in the process (1) was uniformly applied to the surface of the metal base material obtained in the process (2) by electrocoating. More specifically, the metal material and an electrode plate were placed in the paint composition for heat releasing products, and a voltage was applied so that the metal base material served as an anode and the electrode plate served as a cathode.

The electrocoating process was carried out under conditions of a voltage of 100 V and a bath temperature of 26° C. to 32° C. for a current-applying time of 3 minutes, while the paint composition for heat releasing products was stirred using a rotary stirrer. The solid-component concentration of the paint composition for heat releasing products was 15% by weight, and the pH thereof was in a range of 8.0 to 9.5.

(4) Drying and Curing

The metal base material coated with the paint composition for heat releasing products in the process (3) was heated at 160° C. for 60 minutes in a drying machine so that the coat film of the paint composition for heat releasing products on the surface of the metal base material was dried and cured.

(5) Degreasing

After the process (4), the metal base material was heated in a heating furnace at 400° C. for 60 minutes so that the electrocoating resin contained in the coat film was burned out.

(6) Firing

After the process (5), the metal base material was heated in a heating furnace at 850° C. for 20 minutes so that the coat film was fired.

By carrying out the above-mentioned processes, baked samples of the paint composition for heat releasing products each of which has a surface coating layer on the metal base material Example 2

Baked samples of a paint composition for heat releasing products were produced in the same manner as in Example 1, except that in the process of (1) Production of paint composition for heat releasing product of Example 1, the amount of the powder of inorganic particles blended was 0 part by weight, that is, the paint composition for heat releasing products did not contain inorganic particles, and that the amount of the powder of inorganic glass particles blended was 100 parts by weight.

Example 3

Baked samples of a paint composition for heat releasing products were produced in the same manner as in Example 1, except that in the process of (1) Production of paint composition for heat releasing product of Example 1, a cationic electrocoating resin ($T_g$: 25° C.) was used as the electrocoating resin in place of the anionic electrocoating resin, and that in the process of (3) Formation of coat film, the metal base material was used as a cathode and the electrode plate was used as an anode and a voltage was applied thereto.

The cationic electrocoating resin ($T_g$: 25° C.) was prepared by adding a raw material epoxy resin, amines and a solvent; and ring-opening the epoxy ring of the raw material epoxy resin molecule by the reaction with the amines. Specifically, the added raw material epoxy resin was composed of a bisphenol A epoxy resin ("YD-011", manufactured by Nippon Steel Chemical Co., Ltd., 72 parts by weight); the added amines were n-methylethanol amine (4 parts by weight) and methylisobutyl ketamine 75% isobutyl ketone of diethylenetriamine (6 parts by weight); and the added solvent was composed of methylisobutyl ketone (18 parts by weight).

Example 4

Baked samples of a paint composition for heat releasing products were produced in the same manner as in Example 1, except that in the process of (1) Production of paint composition for heat releasing product of Example 1, another anionic electrocoating resin having a different $T_g$ ($T_g$: 5° C.) was used.

The anionic electrocoating resin ($T_g$: 5° C.) was produced by adding a monomer composition, a solvent and a polymerization initiator to a reaction container and polymerizing the monomer composition. Specifically, the added monomer composition was composed of ethyl acrylate (28 parts by weight), 2-ethylhexyl methacrylate (32 parts by weight), methyl methacrylate (14 parts by weight), acrylic acid (9 parts by weight), 2-hydroxyethylacrylate (17 parts by weight) and N-methylolmethacryl amide (4 parts by weight); the added solvent was composed of isopropyl alcohol (IPA) (54 parts by weight) and butyl cellosolve (15 parts by weight); and the added polymerization initiator was composed of azo-bisisobutylonitrile (3 parts by weight).

Example 5

Baked samples of a paint composition for heat releasing products were produced in the same manner as in Example 1, except that in the process of (1) Production of paint composition for heat releasing product of Example 1, another anionic electrocoating resin having a different $T_g$ ($T_g$: 50° C.) was used.

The anionic electrocoating resin ($T_g$: 50° C.) was produced by adding a monomer composition, a solvent and a polymerization initiator to a reaction container and polymerizing the monomer composition. Specifically, the added monomer composition was composed of ethyl acrylate (4 parts by weight), 2-ethylhexyl methacrylate (20 parts by weight), methyl methacrylate (50 parts by weight), acrylic acid (9 parts by weight), 2-hydroxyethylacrylate (17 parts by weight) and N-methylolmethacryl amide (4 parts by weight); the added solvent was composed of isopropyl alcohol (IPA) (54 parts by weight) and butyl cellosolve (15 parts by weight); and the added polymerization initiator was composed of azobisisobutylonitrile (3 parts by weight).

Example 6

Baked samples of a paint composition for heat releasing products were produced in the same manner as in Example 1, except that in the process of (1) Production of paint composition for heat releasing product of Example 1, two kinds of anionic electrocoating resins each having a different $T_g$ (an anionic electrocoating resin having a $T_g$ of 25° C. and another anionic electrocoating resin having a $T_g$ of 50° C.) were used as the electrocoating resin. The amounts of the two kinds of anionic electrocoating resins blended were both 85 parts by weight.

The anionic electrocoating resin ($T_g$: 25° C.) was prepared in the same manner as in Example 1, and the anionic electrocoating resin ($T_g$: 50° C.) was prepared in the same manner as in Example 5.

Example 7

Baked samples of a paint composition for heat releasing products were produced in the same manner as in Example 1, except that in the process of (1) Production of paint composition for heat releasing product of Example 1, the amount of the electrocoating resin was changed to 350 parts by weight.

Example 8

Baked samples of a paint composition for heat releasing products were produced in the same manner as in Example 1, except that in the process of (1) Production of paint composition for heat releasing product of Example 1, the amount of the electrocoating resin was changed to 100 parts by weight.

Reference Example 1

Baked samples of a paint composition for heat releasing products were produced in the same manner as in Example 1, except that in the process of (1) Production of paint composition for heat releasing product of Example 1, another anionic electrocoating resin having a different $T_g$ ($T_g$: −8° C.) was used.

The anionic electrocoating resin ($T_g$: −8° C.) was produced by adding a monomer composition, a solvent and a polymerization initiator to a reaction container and polymerizing the monomer composition. Specifically, the added monomer composition was composed of ethyl acrylate (37 parts by weight), 2-ethylhexyl methacrylate (34 parts by weight), methyl methacrylate (3 parts by weight), acrylic acid (9 parts by weight), 2-hydroxyethylacrylate (17 parts by weight) and N-methylolmethacryl amide (4 parts by weight); the added solvent was composed of isopropyl alcohol (IPA) (54 parts by weight) and butyl cellosolve (15 parts by weight); and the added polymerization initiator was composed of azobisisobutylonitrile (3 parts by weight).

Reference Example 2

Baked samples of a paint composition for heat releasing products were produced in the same manner as in Example 1, except that in the process of (1) Production of paint composition for heat releasing product of Example 1, another anionic electrocoating resin having a different $T_g$ ($T_g$: 55° C.) was used.

The anionic electrocoating resin ($T_g$: 55° C.) was produced by adding a monomer composition, a solvent and a polymerization initiator to a reaction container and polymerizing the monomer composition. Specifically, the added monomer composition was composed of ethyl acrylate (4 parts by weight), 2-ethylhexyl methacrylate (16 parts by weight), methyl methacrylate (54 parts by weight), acrylic acid (9 parts by weight), 2-hydroxyethylacrylate (17 parts by weight) and N-methylolmethacryl amide (4 parts by weight); the added solvent was composed of isopropyl alcohol (IPA) (54 parts by weight) and butyl cellosolve (15 parts by weight); and the added polymerization initiator was composed of azobisisobutylonitrile (3 parts by weight).

Reference Example 3

Baked samples of a paint composition for heat releasing products were produced in the same manner as in Example 1, except that in the process of (1) Production of paint composition for heat releasing product of Example 1, the amount of the electrocoating resin was changed to 380 parts by weight.

Reference Example 4

Baked samples of a paint composition for heat releasing products were produced in the same manner as in Example 1, except that in the process of (1) Production of paint composition for heat releasing product of Example 1, the amount of the electrocoating resin was changed to 80 parts by weight.

Reference Example 5

Baked samples of a paint composition for heat releasing products were produced in the same manner as in Example 1, except that in the process of (1) Production of paint composition for heat releasing product of Example 1, inorganic particles having an average particle diameter of 3.8 μm and inorganic glass particles having an average particle diameter of 4.3 μm were used.

Comparative Example 1

Baked samples of a paint composition for heat releasing products were produced in the same manner as in Example 1, except that in the process of (1) Production of paint composition for heat releasing product of Example 1, methylcellulose (methylcellulose 25, manufactured by Kishida Chemical Co., Ltd.) was used as an organic binder in place of the anionic electrocoating resin, and inorganic particles having an average particle diameter of 3.8 μm and inorganic glass particles having an average particle diameter of 4.3 μm were used, and that in the process (3) Formation of coat of Example 1, the paint composition for heat releasing products was coated by spray coating using a spray coater in place of electrocoating.

Comparative Example 2

Baked samples of a paint composition for heat releasing products were produced in the same manner as in Comparative Example 1, except that in the process of (1) Production of paint composition for heat releasing product of Example 1, the amount of the powder of inorganic particles blended was 0 part by weight, that is, the paint composition for heat releasing products did not contain inorganic particles, and that the amount of the powder of inorganic glass particles blended was 100 parts by weight.

The baked samples of the paint compositions for heat releasing products of Examples 1 to 8, Reference Examples 1 to 5, and Comparative Examples 1 and 2 were evaluated as follows.

(Evaluation of Emissivity)

The emissivity was measured for the baked samples of the paint compositions for heat releasing products by using an emissivity meter D&S AERD manufactured by KEM, and the results thereof are shown in Tables 1A and 1B.

The evaluation results of the emissivity are also shown in Tables 1A and 1B. The evaluation results were based on 5 ratings of "++", "+", "±", "−" and "−−". The "−" rating indicates that the emissivity was not improved in comparison with that of Comparative Example 1 (conventional art); the "±" rating indicates that the emissivity was slightly improved (by 0.01) in comparison with that of Comparative Example 1 (conventional art); the "+" rating indicates that the emissivity was comparatively improved (by 0.02 to 0.05) in comparison with that of Comparative Example 1 (conventional art); the "++" rating indicates that the emissivity was remarkably improved (by 0.06 or more) in comparison with that of Comparative Example 1 (conventional art); the "−−" rating indicates that the emissivity was worse than that of Comparative Example 1 (conventional art).

The evaluation results of the emissivity were as follows: the "++" rating was given to Example 1; the "+" rating was given to Examples 2 to 8; the "±" rating was given to Reference Example 5; the "−" rating was given to Reference Examples 1 and 2 and Comparative Example 1; and the "−−" rating was given to Reference Examples 3 and 4 and Comparative Example 2.

(Evaluation of Heat Impact Resistance)

Each of the baked samples of the paint compositions for heat releasing products was heated in a heating furnace at 850° C. for 10 minutes, and then directly put into water at 25° C. without a cooling period of time, and evaluated as to whether or not part of the surface coating layer (the baked coat of each paint composition for heat releasing products) fell off or cracks were observed in the surface coating layer.

The evaluation results of the heat impact resistance are shown in Tables 1A and 1B. The evaluation results were based on 3 ratings of "+", "±" and "−−". The "+" rating indicates that neither falling off nor cracks were observed; the "±" rating indicates that although falling off was not observed, cracks were observed; the "−−" rating indicates that falling off was observed. Since falling off is more severe damage to the surface coating layer than cracks, the "−−" rating was given to example which falling off was observed.

The results of evaluations of heat impact resistance were as follows: the "+" rating was given to Examples 1 to 8 and Reference Examples 1 to 5; the "±" rating was given to Comparative Example 1; and the "−−" rating was given to Comparative Example 2.

(General Evaluation)

Based on the evaluations of emissivity and heat impact resistance, the results of Examples 1 to 8, Reference Examples 1 to 5, and Comparative Examples 1 and 2 were evaluated based on a general evaluation, as shown in Tables 1A and 1B.

The general evaluation were based on 4 ratings of "++", "+", "±" and "−−". The "++" rating was given to those evaluated as "++" in the emissivity evaluation and evaluated as "+" in the heat impact resistance evaluation; the "+" rating was given to those evaluated as "+" in the emissivity evaluation and also evaluated as "+" in the heat impact resistance evaluation; the "±" rating was given to those evaluated as "±", "−" or "−−" in the emissivity evaluation and evaluated as "+" in the heat impact resistance evaluation; and the "−−" rating was given to those evaluated as "±" or "−−" in the evaluation of heat impact resistance.

Here, the "++" is the best rating, "+" is the second best rating next to "++", "±" is a better rating next to "+", and "−−" is the worst rating.

TABLE 1A

| | Paint composition for heat releasing product | | | | |
|---|---|---|---|---|---|
| | Inorganic glass particle | | Inorganic particle | | |
| | Kind | Average particle diameter [μm] | Kind | Blending ratio | Average particle diameter [μm] |
| Example 1 | SiO$_2$—BaO—B$_2$O$_3$ | 0.9 | MnO$_2$—FeO—CuO—CoO | 6:2:1:1 | 0.8 |
| Example 2 | SiO$_2$—BaO—B$_2$O$_3$ | 0.9 | — | — | — |
| Example 3 | SiO$_2$—BaO—B$_2$O$_3$ | 0.9 | MnO$_2$—FeO—CuO—CoO | 6:2:1:1 | 0.8 |
| Example 4 | SiO$_2$—BaO—B$_2$O$_3$ | 0.9 | MnO$_2$—FeO—CuO—CoO | 6:2:1:1 | 0.8 |
| Example 5 | SiO$_2$—BaO—B$_2$O$_3$ | 0.9 | MnO$_2$—FeO—CuO—CoO | 6:2:1:1 | 0.8 |
| Example 6 | SiO$_2$—BaO—B$_2$O$_3$ | 0.9 | MnO$_2$—FeO—CuO—CoO | 6:2:1:1 | 0.8 |
| Example 7 | SiO$_2$—BaO—B$_2$O$_3$ | 0.9 | MnO$_2$—FeO—CuO—CoO | 6:2:1:1 | 0.8 |
| Example 8 | SiO$_2$—BaO—B$_2$O$_3$ | 0.9 | MnO$_2$—FeO—CuO—CoO | 6:2:1:1 | 0.8 |
| Reference Example 1 | SiO$_2$—BaO—B$_2$O$_3$ | 0.9 | MnO$_2$—FeO—CuO—CoO | 6:2:1:1 | 0.8 |
| Reference Example 2 | SiO$_2$—BaO—B$_2$O$_3$ | 0.9 | MnO$_2$—FeO—CuO—CoO | 6:2:1:1 | 0.8 |
| Reference Example 3 | SiO$_2$—BaO—B$_2$O$_3$ | 0.9 | MnO$_2$—FeO—CuO—CoO | 6:2:1:1 | 0.8 |
| Reference Example 4 | SiO$_2$—BaO—B$_2$O$_3$ | 0.9 | MnO$_2$—FeO—CuO—CoO | 6:2:1:1 | 0.8 |
| Reference Example 5 | SiO$_2$—BaO—B$_2$O$_3$ | 4.3 | MnO$_2$—FeO—CuO—CoO | 6:2:1:1 | 3.8 |
| Comparative Example 1 | SiO$_2$—BaO—B$_2$O$_3$ | 4.3 | MnO$_2$—FeO—CuO—CoO | 6:2:1:1 | 3.8 |

TABLE 1A-continued

| | | | | | |
|---|---|---|---|---|---|
| Comparative Example 2 | $SiO_2$—BaO—$B_2O_3$ | 4.3 | — | — | — |

Paint composition for heat releasing product

| | Organic binder | | Weight ratio | |
|---|---|---|---|---|
| | Kind | Tg [°C.] | Inorganic glass particle-inorganic particle-organic binder blending ratio | Organic biner/ (inorganic glass particle + inorganic particle) |
| Example 1 | Electrocoating resin Anionic | 25 | 6:4:17 | 1.7 |
| Example 2 | Electrocoating resin Anionic | 25 | 10:0:17 | 1.7 |
| Example 3 | Electrocoating resin Cationic | 25 | 6:4:17 | 1.7 |
| Example 4 | Electrocoating resin Anionic | 5 | 6:4:17 | 1.7 |
| Example 5 | Electrocoating resin Anionic | 50 | 6:4:17 | 1.7 |
| Example 6 | Electrocoating resin Anionic | 25, 50 | 6:4:17 | 1.7 |
| Example 7 | Electrocoating resin Anionic | 25 | 6:4:35 (upper limit) | 3.5 |
| Example 8 | Electrocoating resin Anionic | 25 | 6:4:10 (lower limit) | 1.0 |
| Reference Example 1 | Electrocoating resin Anionic | −8 | 6:4:17 | 1.7 |
| Reference Example 2 | Electrocoating resin Anionic | 55 | 6:4:17 | 1.7 |
| Reference Example 3 | Electrocoating resin Anionic | 25 | 6:4:38 (over upper limit) | 3.8 |
| Reference Example 4 | Electrocoating resin Anionic | 25 | 6:4:8 (below lower limit) | 0.8 |
| Reference Example 5 | Electrocoating resin Anionic | 25 | 6:4:17 | 1.7 |
| Comparative Example 1 | Methyl cellulose | — | 6:4:17 | 1.7 |
| Comparative Example 2 | Methyl cellulose | — | 10:0:17 | 1.7 |

TABLE 1B

| | Evaluation result | | | |
|---|---|---|---|---|
| | Emissivity | | Heat impact | |
| | Measured value | Evaluation | resistance Evaluation | General evaluation |
| Example 1 | 0.87 | ++ | + | ++ |
| Example 2 | 0.84 | + | + | + |
| Example 3 | 0.83 | + | + | + |
| Example 4 | 0.85 | + | + | + |
| Example 5 | 0.85 | + | + | + |
| Example 6 | 0.86 | + | + | + |
| Example 7 | 0.83 | + | + | + |
| Example 8 | 0.83 | + | + | + |
| Reference Example 1 | 0.81 | − | + | ± |
| Reference Example 2 | 0.81 | − | + | ± |
| Reference Example 3 | 0.80 | −− | + | ± |
| Reference Example 4 | 0.79 | −− | + | ± |
| Reference Example 5 | 0.82 | ± | + | ± |
| Comparative Example 1 | 0.81 | − | ± | −− |
| Comparative Example 2 | 0.80 | −− | −− | −− |

In the general evaluation, better ratings were given to Examples 1 to 8 and Reference Examples 1 to 5 to which the "+" rating was given in the heat impact resistance evaluation.

A possible reason for this is that an electrocoating resin was used as the organic binder in Examples 1 to 8 and Reference Examples 1 to 5, while methyl cellulose was used as the organic binder in Comparative Examples 1 and 2.

Specifically, the reason is as follows: as described in the effect (1) of the paint composition for heat releasing products of the present embodiment, the use of the electrocoating resins resulted in the formation of concave portions on the surface coating layer in Examples 1 to 8 and Reference Examples 1 to 5.

The emissivities of Examples 1 to 8 were higher than those of Reference Examples 1 and 2.

A possible reason for this is that the electrocoating resins used in Examples each had a $T_g$ within the range of 5° C. to 50° C., while the electrocoating resins used in Reference Examples 1 and 2 each had a $T_g$ outside the range of 5° C. to 50° C. ($T_g$ of Reference Example 1: −8° C., $T_g$ of Reference Example 2: 55° C.)

Specifically, the reason is as follow: as described in the effect (7) of the paint composition for heat releasing products of the present embodiment, since the electrocoating resins each having a $T_g$ within the range of 5° C. to 50° C. were used in Examples 1 to 8, good flowability of the electrocoating resin could be achieved, thereby facilitating the formation of paths during electrocoating.

The emissivities of Examples 1 to 8 were higher than those of Reference Examples 3 and 4.

A possible reason for this is that the weight ratio of the electrocoating resin based on the total weight of the inorganic particles and the inorganic glass particles was within the range of 1.0 to 3.5 in Examples 1 to 8, while the weight ratio of the electrocoating resin based on the total weight of the inorganic particles and the inorganic glass particles in Reference Examples 3 and 4 was outside the range of 1.0 to 3.5 (Reference Example 3: 3.8, Reference Example 4: 0.8).

Specifically, the reason is as follows: as described in the effect (3) of the paint composition for heat releasing products of the present embodiment, desired concave portions could be formed on the surface coating layer by adjusting the weight ratio of the electrocoating resin within the range of 1.0 to 3.5 based on the total weight of the inorganic particles and the inorganic glass particles in Example 1 to 8.

The emissivity of Reference Example 3 was worse than that of Comparative Example 1 (conventional art) by 0.01. A possible reason for this is that the weight ratio of the electrocoating resin in Reference Example 3 was outside the range of 1.0 to 3.5 (3.8) based on the total weight of the inorganic particles and the inorganic glass particles.

Specifically, the reason is as follow: due to too much electrocoating resin, the inorganic particles and the inorganic glass particles were separated from one another, and therefore collapsed and fell off when the electrocoating resin disappeared as a result of heating in the process of degreasing the electrocoating resin (see the effect (3) of the paint composition for heat releasing products of the present embodiment).

The emissivity of Reference Example 4 was also worse than that of Comparative Example 1 (conventional art) by 0.02. A possible reason for this is that the weight ratio of the electrocoating resin in Reference Example 4 was outside the range of 1.0 to 3.5 (0.8) based on the total weight of the inorganic particles and the inorganic glass particles.

Specifically, the reason can be explained as follows: due too little electrocoating resin, the coat film deposited by electrocoating contained more solids (particles), which lead to poor flowability of the coat film during application of the electrocoating current so that the path formation and coat film formation around the paths hardly progressed; and due to excessive amounts of the inorganic particles and the inorganic glass particles in the paint composition for heat releasing products, the inorganic particles and the inorganic glass particles were precipitated, thereby making it impossible to form a coat film in a stable manner (see the effect (3) of the paint composition for heat releasing products of the present embodiment).

The emissivity of Reference Example 5 was improved only by 0.01 and was evaluated as "±".

A possible reason for this is that the inorganic glass particles and the inorganic particles were large (average particle diameters: 4.3 μm and 3.8 μm, respectively) in Reference Example 5, while the inorganic glass particles were small (average particle diameter: 0.9 μm) and the inorganic particles which were optionally contained in the paint compositions for heat releasing products were also small (average particle diameter: 0.8 μm) in Examples 1 to 8.

Specifically, the reason is as follows: as described in the effect (4) of the paint composition for heat releasing products of the present embodiment, the use of the inorganic glass particles and inorganic particles having small average particle diameters provided advantages such as stabilization of the inorganic glass particles and the inorganic particles in the paint solution, resulting in the formation of desired concave portions on the surface of the surface coating layer in Examples 1 to 8.

The emissivities of Examples 1 and 2 were 0.87 and 0.84, respectively. Thus, Example 1 was evaluated higher than Example 2.

A possible reason for this is that the paint composition for heat releasing products of Example 1 contained inorganic particles, while the paint composition for heat releasing products of Example 2 did not contain inorganic particles.

Specifically, the reason is as follows: as described in the effect (2) of the paint composition for heat releasing products of the present embodiment, the use of the paint composition for heat releasing products which contained inorganic particles caused the inorganic particles in the surface coating layer to emit infrared rays and suppressed the flow of the coat film around the concave portions during the firing, thereby facilitating the formation of concave portions on the surface of the surface coating layer in Example 1.

The emissivities of Examples 1 and 3 were 0.87 and 0.83, respectively. Thus, Example 1 was evaluated higher than Example 3.

A possible reason for this is that an anionic electrocoating resin was used as the electrocoating resin in Example 1, while a cationic electrocoating resin was used as the electrocoating resin in Example 3.

Specifically, the reason is as follows: as described in the effect (5) of the paint composition for heat releasing products of the present embodiment, the use of the anionic electrocoating resin as the electrocoating resin contributed to better compatibility between the surface charge of the inorganic particles and the surface charge of the inorganic glass particles, resulting in higher stability of the paint composition for heat releasing products in Example 1.

(Other Embodiments)

In other embodiments of the present invention, the shape of the metal base material is not particularly limited, and may be formed into a substantially flat plate shape or a substantially semi-cylindrical shape, and its outer peripheral shape of the cross-section may be a substantially round shape, or may be other shapes such as a substantially elliptical shape or a substantially polygonal shape. In the case where the paint composition for heat releasing products according to an embodiment of the present invention is intended to be applied to exhaust pipes, the shape of the metal base material is desirably a substantially cylindrical shape, as described in the above embodiment.

In other embodiments of the present invention, the paint composition for heat releasing product may not be applied to the entire outer circumferential surface of the base material and may be applied to only part of the outer circumferential surface of the base material.

However, in the case where the paint composition for heat releasing products is applied to only part of the outer circumferential surface of the base material, the area of the part to which the paint composition for heat releasing products is applied is desirably about 10% or more, more desirably about 50% or more, and furthermore desirably about 80% or more of the entire area of the outer circumferential surface of the metal base material. In the case where the area of the part to which the paint composition for heat releasing products is applied is not less than about 10% of the entire area of the outer circumferential surface of the metal base material, the area coated with the paint composition for heat releasing products is not so small, possibly facilitating effective suppression of the temperature rise of the inside of the heat releasing product.

In other embodiments of the present invention, the paint composition for heat releasing products may not be applied to the outer circumferential surface of the base material but may be applied to the inner circumferential surface of the base material. Herein, the outer circumferential surface of the base material refers to a surface having a larger area of the surfaces of the base material, and the inner circumferential surface of the base material refers to a surface having a smaller area of the surfaces of the base material.

Alternatively, the paint composition for heat releasing products may be applied to both surfaces of the base material.

The paint composition for heat releasing products of the embodiment of the present invention essentially includes inorganic glass particles and an organic binder, and the organic binder essentially includes an electrocoating resin.

By combining these essential constituents with various constitutions described in the embodiments in detail (such as kinds of inorganic glass particles, kinds of inorganic particles and the like) appropriately, it becomes possible to obtain desired effects.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A paint composition for heat releasing products, comprising:
    inorganic glass particles;
    inorganic particles other than the glass particles; and
    an organic binder comprising an electrocoating resin, the paint composition being to be applied to a base material made of a metal,
wherein
    said inorganic glass particles have an average particle diameter of about 3 μm or less, and
    said inorganic particles have an average particle diameter of about 3 μm or less.

2. The paint composition according to claim 1,
wherein
    said electrocoating resin has a weight ratio of from about 1.0 to about 3.5 based on a weight of said inorganic glass particles.

3. The paint composition according to claim 1,
wherein
    said electrocoating resin has a weight ratio of from about 1.0 to about 3.5 based on a total weight of said inorganic particles and said inorganic glass particles.

4. The paint composition according to claim 1,
wherein
    said inorganic particles are made of an oxide of a transition metal.

5. The paint composition according to claim 1,
wherein
    said inorganic glass particles have a softening point of from about 300° C. to about 1000° C.

6. The paint composition according to claim 1,
wherein
    said electrocoating resin is an anionic electrocoating resin.

7. The paint composition according to claim 6,
wherein said anionic electrocoating resin is an acrylic resin.

8. The paint composition according to claim 7,
wherein said acrylic resin is a copolymer acrylic resin obtained by polymerizing a monomer composition including a carboxyl group-containing ethylenic polymerizable monomer and another ethylenic polymerizable monomer.

9. The paint composition according to claim 8,
wherein said another ethylenic polymerizable monomer comprises a (meth)acrylate having an ester unit with one or more carbon atoms.

10. The paint composition according to claim 9,
wherein said (meth)acrylate having an ester unit with one or more carbon atoms includes two or more kinds of (meth)acrylates, and
said two or more kinds of (meth)acrylates include a (meth)acrylate having an ester unit with one or two carbon atoms.

11. The paint composition according to claim 1,
wherein
said electrocoating resin includes a plurality of electrocoating resins each having a different $T_g$.

12. The paint composition according to claim 1,
wherein
said electrocoating resin has a $T_g$ of from about 5° C. to about 50° C.

13. The paint composition according to claim 1,
wherein said paint composition is used as a paint composition for coating exhaust pipes for vehicle engines.

14. The paint composition according to claim 1,
wherein
said inorganic particles have an average particle diameter of about 1 μm or less, and
said inorganic glass particles have an average particle diameter of about 1 μm or less.

15. The paint composition according to claim 1,
wherein an amount of the inorganic glass particles is from about 40% by weight to about 99.5% by weight based on a total amount of the inorganic glass particles and the inorganic particles by weight.

16. The paint composition according to claim 15,
wherein the amount of the inorganic glass particles is from about 60% by weight to about 80% by weight based on the total amount of the inorganic glass particles and the inorganic particles by weight.

* * * * *